(12) United States Patent
Yoshida et al.

(10) Patent No.: US 7,257,074 B2
(45) Date of Patent: Aug. 14, 2007

(54) WRITE ONCE RECORDING MEDIUM, RECORDING DEVICE AND RECORDING METHOD FOR WRITE ONE RECORDING MEDIUM, AND REPRODUCTION DEVICE AND REPRODUCTION METHOD FOR WRITE ONCE RECORDING MEDIUM

(75) Inventors: Masayoshi Yoshida, Saitama (JP); Takeshi Koda, Saitama (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 10/535,426

(22) PCT Filed: Feb. 27, 2004

(86) PCT No.: PCT/JP2004/002393

§ 371 (c)(1),
(2), (4) Date: Jan. 12, 2006

(87) PCT Pub. No.: WO2004/077432

PCT Pub. Date: Sep. 10, 2004

(65) Prior Publication Data

US 2006/0253450 A1    Nov. 9, 2006

(30) Foreign Application Priority Data

Feb. 28, 2003    (JP)    ............................ 2003-054987

(51) Int. Cl.
*G11B 7/24*    (2006.01)
*G11B 5/09*    (2006.01)

(52) U.S. Cl. .............................. 369/275.3; 369/53.17; 369/53.2; 369/53.15; 369/47.14

(58) Field of Classification Search .................... None
See application file for complete search history.

(56) References Cited

U.S. PATENT DOCUMENTS

| | | | |
|---|---|---|---|
| 6,469,978 B1 | 10/2002 | Ohata et al. | |
| 2004/0105363 A1* | 6/2004 | Ko et al. | 369/47.14 |
| 2004/0165495 A1* | 8/2004 | Park et al. | 369/47.14 |
| 2006/0242481 A1* | 10/2006 | Hwang et al. | 714/710 |

FOREIGN PATENT DOCUMENTS

| | | |
|---|---|---|
| EP | 0997904 | 5/2000 |
| JP | 2000-195178 | 7/2000 |
| JP | 2001-176204 | 6/2001 |
| JP | 2002-329321 | 11/2002 |
| WO | 01/22416 | 3/2001 |
| WO | 2004/029941 | 4/2004 |

* cited by examiner

*Primary Examiner*—Muhammad Edun
(74) *Attorney, Agent, or Firm*—Young & Thompson

(57) ABSTRACT

A temporary defect management area 14 is placed between a control information recording area 12 and a data area 11. Before a recording medium 10 is finalized, defect management information is temporarily recorded into the temporary defect management area. Upon finalizing, the defect management information is recorded into a definite defect management area 13 placed in the control information recording area.

21 Claims, 17 Drawing Sheets

120 →
121 — SETTING INFORMATION { START ADDRESS OF USER DATA AREA / END ADDRESS OF USER DATA AREA / SIZE OF INNER SPARE AREA / SIZE OF OUTER SPARE AREA / OTHER INFORMATION
122 — DEFECT LIST

122 →

| DEFECT ADDRESS | SPARE ADDRESS | OTHER INFO. |
|---|---|---|
| ADDRESS aaaa | ADDRESS gggg | |
| ADDRESS bbbb | ADDRESS kkkk | |
| ADDRESS cccc | ADDRESS mmmm | |
| ADDRESS dddd | ADDRESS nnnn | |
| ⋮ | ⋮ | |

WRITE ONCE RECORDING MEDIUM, RECORDING DEVICE AND RECORDING METHOD FOR WRITE ONE RECORDING MEDIUM, AND REPRODUCTION DEVICE AND REPRODUCTION METHOD FOR WRITE ONCE RECORDING MEDIUM

TECHNICAL FIELD

The present invention relates to a write-once-type recording medium, a recording apparatus for and a recording method of recording record data which is to be recorded onto the write-once-type recording medium, and a reproducing apparatus for and a reproducing method of reproducing the record data recorded on the write-once-type recording medium.

BACKGROUND ART

As a technique of improving the reliability of the recording and reading of record data on a high-density recording medium, such as an optical disc, a magnetic disc, and a magneto optical disc, there is defect management. Namely, when there are scratches or dusts, or deterioration (which are collectively referred to as a "defect") on the recording medium, data to be recorded or already recorded at the position of the defect is recorded in another area on the recording medium (which is referred to as a "spare area"). As described above, by evacuating to the spare area the record data which is possibly imperfectly or incompletely recorded or read because of the defect, it is possible to improve the reliability of the recording and reading of the record data (refer to Japanese Patent Application Laying Open NO. Hei 11-185390).

In general, a defect list is made to perform the defect management. On the defect list, there are recorded address information for indicating the position of a defect on the recording medium, and address information for indicating a position in the spare area (e.g. a recording position in the spare area) to which the data to be recorded or already recorded at the position of the defect is evacuated.

In general, the defect list is made when a recording medium is initialized or formatted. It is also made when the record data is recorded onto the recording medium. When the record data is recorded and rewritten several times, the defect list is made or updated every time the record data is recorded and rewritten.

When the record data is recorded onto the recording medium, the defect list is referred to. This allows the recording of the record data onto the recording medium away from the position of a defect. On the other hand, the defect list is also referred to when the record data recorded on the recording medium is reproduced or read. This makes it possible to surely read both the record data recorded in a normal recording area and the record data recorded in the spare area because of the presence of a defect, on the basis of the defect list.

The defect list is generally recorded in a specific area on the recording medium, which is the object of the making or updating of the defect list. The defect list is read from the recording medium next time when the record data recorded on the recording medium is reproduced or when other record data is rewritten or additionally recorded. Then the defect list is referred to in a reading operation by a reading apparatus or in a reproduction operation by a reproducing apparatus.

DISCLOSURE OF INVENTION

The defect list is recorded in a specific area on the recording medium. For example, with respect to a rewritable optical disc using a blue laser, the defect list is recorded in a predetermined area (which is hereinafter referred to as a "defect management area") reserved in a lead-in area or lead-out area on the disc.

As described above, the defect list is updated every time the record data is recorded and rewritten. Then, the defect list is overwritten in the defect management area on the recording medium, which is the object of the recording and rewriting, every time the defect list is updated by the recording and rewriting of the record data. Namely, the defect list in the defect management area is rewritten every time the defect list is updated.

Such updating of the defect list by rewriting it can be realized only in case that the recording medium is rewritable. In case that the recording medium is a so-called "write-once-type recording medium", for example, a write-once-type optical disc, it is necessary to use another method to realize the updating of the defect list. For example, a conceivable method as the method of realizing the updating of the defect list is such that every time the defect list is updated, the updated defect list is recorded in a new unrecorded or blank area on the write-once-type recording medium.

According to this method, however, every time the defect list is updated, it is necessary to reserve or ensure an area to record the updated defect list. It is also necessary to estimate in advance the number of times the defect list is updated and to reserve in advance the defect management area large enough to record the defect list by the number of times. In any case, in order to realize the updating of the defect list on the write-once-type recording medium, it is necessary to reserve a larger area to record the defect list (i.e., the larger defect management area), as compared with the case where the defect list can be rewritten or overwritten.

As a result, the data structure of the write-once-type recording medium is different from that of the rewritable-type recording medium, which causes the problem that they are mutually incompatible regarding the reading of data recorded on the recording media. For example, enlarging the defect management area in the lead-in area extends the lead-in area, which causes different ranges of the lead-in areas between the write-once-type recording medium and the rewritable-type recording medium. Consequently, both recording media become incompatible, which possibly causes the problem that a drive apparatus for the existing rewritable-type recording medium cannot reproduce the data on the write-once-type recording medium.

It is therefore an object of the present invention to provide: a write-once-type recording medium which has a defect management function and which is compatible with a rewritable-type recording medium; a recording apparatus for and a recording method of recording record data onto the write-once-type recording medium; and a reproducing apparatus for and a reproducing method of reproducing the record data recorded on the write-once-type recording medium.

The above object of the present invention can be achieved by a write-once-type recording medium provided with: a data area to record therein record data; a control information recording area to record therein information for controlling an operation of recording and/or reading in the data area, the control information recording area including a definite defect management area to record therein defect management information of the data area; and a temporary defect management area to temporarily record therein the defect management information of the data area, the temporary defect management area being placed between the control information recording area and the data area.

The above object of the present invention can be also achieved by a recording apparatus for recording record data onto the above described write-once-type recording medium of the present invention, the recording apparatus provided with: a first recording device for recording the record data into the data area; a memory device for storing therein the defect management information; a second recording device for recording the defect management information stored in the memory device, into the temporary defect management area; and a third recording device for recording the defect management information stored in the memory device, into the definite defect management area.

The above object of the present invention can be also achieved by a reproducing apparatus for reproducing record data recorded on the above described write-once-type recording medium of the present invention, the reproducing apparatus provided with: a memory device; a first reading device for reading the defect management information recorded in the temporary defect management area and storing the read defect management information into the memory device; and a reproducing device for reproducing the record data recorded in the data area on the basis of the defect management information stored in the memory device.

The above object of the present invention can be also achieved by a first computer program of instructions for tangibly embodying a program of instructions executable by a computer to make the computer function as the above described recording apparatus of the present invention (including its various aspects).

The above object of the present invention can be also achieved by a second computer program of instructions for tangibly embodying a program of instructions executable by a computer to make the computer function as the above described reproducing apparatus of the present invention (including its various aspects).

The above object of the present invention can be also achieved by a first computer program product in a computer-readable medium for tangibly embodying a program of instructions executable by a computer to make the computer function as the above-described recording apparatus of the present invention (including its various aspects).

The above object of the present invention can be also achieved by a second computer program product in a computer-readable medium for tangibly embodying a program of instructions executable by a computer to make the computer function as the above-described reproducing apparatus of the present invention (including its various aspects).

According to the first or second computer program product of the present invention, the recording apparatus or reproducing apparatus of the present invention described above can be embodied relatively readily, by loading the computer program product from a recording medium for storing the computer program product, such as a ROM, a CD-ROM, a DVD-ROM, a hard disk or the like, into the computer, or by downloading the computer program product, which may be a carrier wave, into the computer via a communication device. More specifically, the first or second computer program product may be provided with computer readable codes (or computer readable commands) to make the computer to function as the recording apparatus or reproducing apparatus of the present invention described above.

The above object of the present invention can be also achieved by a recording method of recording record data onto the above described write-once-type recording medium of the present invention, the recording method provided with: a first recording process of recording the record data into the data area; a defect-management-information generating process of generating or updating the defect management information; a second recording process of recording the defect management information generated or updated in the defect-management-information generating process, into the temporary defect management area; a finalize-command process of giving a command for indicating to finalize the recording medium; and a third recording process of recording the defect management information generated or updated in the defect-management-information generating process, into the definite defect management area in case that the command for indicating to finalize is given in the finalize-command process.

The above object of the present invention can be also achieved by a reproducing method of reproducing record data recorded on the above described write-once-type recording medium of the present invention, the reproducing method provided with: a detecting process of detecting whether or not the recording medium is already finalized; a first reading process of reading the defect management information recorded in the temporary defect management area and storing the read defect management information into the memory device in case that it is detected that the write-once-type recording medium is not finalized; a second reading process of reading the defect management information recorded in the definite defect management area and storing the read defect management information into the memory device in case that it is detected that the write-once-type recording medium is already finalized; and a reproducing process of reproducing the record data recorded in the data area on the basis of the defect management information stored in the memory device.

These functions and other advantages of the present invention will be apparent from the following descriptions of embodiments and examples.

BEST MODE FOR CARRYING OUT THE INVENTION

The embodiments of the present invention will be explained with reference to the drawings hereinafter.

Embodiment of Recording Medium

An embodiment of the recording medium of the present invention will be explained with reference to the drawings. Incidentally, the drawings used for the explanation of the embodiments of the present invention embody constitutional elements or the like of the recording medium, recording apparatus or reproducing apparatus of the present invention only for the purpose of explaining technical ideas thereof. The shape, size, position, connection relationship, and the like of various constitutional elements or the like are not limited to the drawings.

Figure 1:
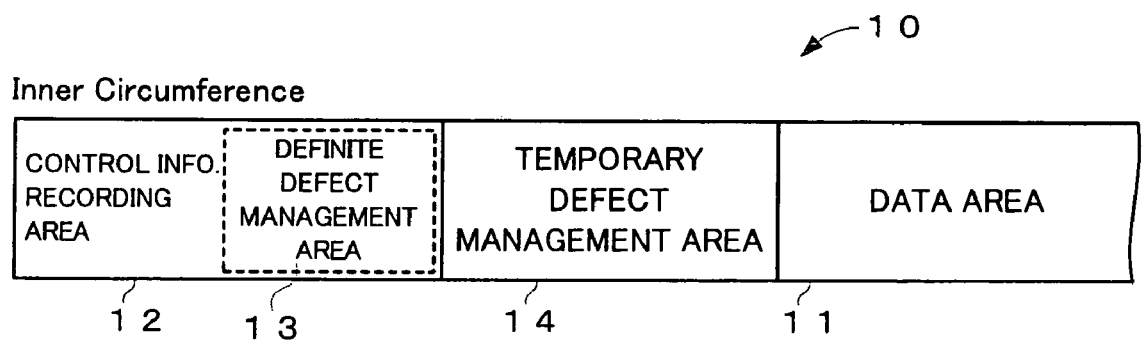
FIG. 1 is an explanatory diagram showing an embodiment of a write-once-type recording medium of the present invention.

FIG. 1 shows the structure of data or information to be recorded or already recorded on a disc-shaped recording medium 10, which is an embodiment of the recording medium of the present invention. The left side of FIG. 1 is the inner circumferential side of the disc-shaped recording medium 10.

The recording medium 10 is a disc-shaped recording medium, such as an optical disc, a magnetic disc, a magneto optical disc, and a dielectric recording disc. The recording medium 10 is a write-once-type recording medium which allows the recording of record data only once at each position, e.g. a write once recording disc.

As shown in FIG. 1, the recording medium 10 is provided with: a data area 11; a control information recording area 12; a definite defect management area 13 placed in the control information recording area 12; and a temporary defect management area 14. It is also provided with another control information recording area (which is not illustrated) on the outer circumferential side of the data area 11.

The data area 11 is intended to record or write-once therein the "record data". The control information recording area 12 is intended to record or write-once therein the control information for controlling the recording and reading in the data area 11.

Information or data which is recorded on the recording medium 10 can be classified into the record data and the control information. The record data is data which is mainly the object of reproduction or execution, e.g. image data; audio data; text data; contents data; a computer program; or the like. On the other hand, the control information is information for controlling the recording and reading in the data area 11, e.g. information for indicating the attribute and type of the recording medium 10; information for managing the address of the record data; information for controlling the recording and reading operations of a drive apparatus; or the like. The record data and the control information cannot be always clearly classified in accordance with the content thereof. However, the control information is mainly used directly for the operation control of the drive apparatus, while the record data is mainly only the object of recording and reading and is mainly used in a data reproduction operation or in a program execution operation by a backend or a host computer. In response to such a difference of their properties or the like, the record data is recorded in the data area 11 and the control information is recorded in the control information recording area 12.

The definite defect management area 13 is included in the control information recording area 12. The definite defect management area 13 is intended to record therein the defect management information of the data area 11.

The temporary defect management area 14 is placed between the control information recording area 12 and the data area 11. The temporary defect management area 14 is intended to temporarily record therein the defect management information of the data area 11.

The defect management information is used for the defect management. The defect management is as follows. When there is a defect, such as scratches, dusts, or deterioration, in or on the recording medium 10, the record data is recorded into a position away from the position of the defect. At the same time, the record data to be originally recorded or already recorded at the position of the defect is recorded into the spare area on the recording medium 10. Moreover, the following operations are also performed as a part of the defect management: an operation of recognizing the position of a defect upon reproducing the record data recorded on the recording medium 10; and an operation of reading from the spare area the record data to be originally recorded or already recorded at the position of the defect.

A defect list is used for the defect management. On the defect list, there are recorded address information for indicating the position of a defect on the recording medium, and address information for indicating a position in the spare area at which the data to be originally recorded or already recorded at the position of the defect is alternatively recorded. The defect list is made or updated when the record data is recorded onto the recording medium 10 (e.g. upon verifying). Moreover, a defect changes or increases as the recording medium 10 is continuously used. For example, fingerprints are often left on a recording surface during the use of the recording medium 10. Thus, the defect list is made or updated at each opportunity of recording and/or reproducing with respect to the recording medium 10. Such a defect list is included in the defect management information.

As shown in FIG. 1, there are the temporary defect management area 14 and the definite defect management area 13 on the recording medium 10. These two defect management areas are both intended to record the defect management information. However, these two defect management areas are provided for their own different purposes, and their physical structures are different from each other.

The temporary defect management area 14 is intended to temporarily record the defect management information into it. For example, the temporary defect management area 14 is used to record therein the defect management information until the recording medium 10 is finalized. Specifically, if the defect management information is made upon initializing or formatting the recording medium 10, the defect management information is recorded into the temporary defect management area 14. If the defect management information is updated upon recording the record data, the defect management information is recorded in the temporary defect management area 14.

The temporary defect management area 14 is a larger area than the definite defect management area 13. This purpose is to record a plurality of defect management information, responding to the number of the updating of the defect management information when it is updated several times. This is based on the fact that the updated defect management information cannot be overwritten at the same position because the recording medium 10 is a write-once-type recording medium, which allows recording only once at each position. For example, the temporary defect management area 14 is large enough to record therein the defect management information twice or more.

The temporary defect management area 14 is placed between the control information recording area 12 and the data area 11. As described above, the temporary defect management area 14 is relatively large. Thus if this area is desired to be placed in the control information recording area 12, there is no choice to extend the control information recording area 12. In this embodiment, however, it is unnecessary to extend the control information recording area 12 to reserve or ensure the temporary defect management area 14 because the temporary defect management area 14 is placed out of the control information recording area 12. Moreover, information recorded in the temporary defect management area 14 is the defect management information, and this is not the record data but the control information in view of its properties. Therefore, it is not preferable to place the temporary defect management area 14 in the data area 11 which is intended to record the "record data". In the embodiment, the temporary defect management area 14 is placed out of the data area 11, so that it is possible to avoid such an unprefarable situation.

By placing the temporary defect management area 14 between the control information recording area 12 and the data area 11 as described above, the temporary defect management area 14 can be placed on the recording medium 10 without extending the control information recording area 12 and without placing it in the data area 11. This allows the compatibility between the write-once-type recording medium 10 and a general rewritable-type recording medium.

On the other hand, the definite defect management area 13 is intended to definitely record the defect management information into it. For example, when the recording medium 10 is finalized, so that the defect management information will be no longer updated and the content of the defect management information is determined, the definite defect management area 13 is used to record therein the defect management information.

The definite defect management area 13 is a narrower area than the temporary defect management area 14. This is because all it needs is that at least one defect management information whose content is determined or fixed can be recorded in the area.

The definite defect management area 13 is placed in the control information recording area 12. Most rewritable-type recording media generally spread have such a structure that the defect management area is placed in the control information recording area. Moreover, most rewritable-type recording media which will be developed from now on will predictably have such a structure that the defect management area is placed in the control information recording area. One of the reasons is as follows. For example, the defect management information to be recorded in the defect management area belongs to the control information in view of its properties and is mainly used directly for the operation control of the drive apparatus. Thus it is reasonable and efficient to record it with other control information in the control information recording area. Another reason is as follows. For example, in the case of a rewritable-type recording medium, even if the defect management information is updated many times, it is enough to overwrite the updated defect management information at the same position in the defect management area. Thus it is enough to ensure the relatively narrow defect management area at which at least one set of the defect management information can be recorded, and it is unnecessary to extend the control information recording area. In the embodiment, the same structure as that of such a general rewritable-type recording medium is adopted by placing the definite defect management area 13 in the control information recording area 12. This allows the compatibility between the write-once-type recording medium 10 and a general rewritable-type recording medium.

Now, one example of a method of using the temporary defect management area 14 and the definite defect management area 13 is explained specifically. When a user inserts or loads the recording medium 10 into a recording apparatus and starts recording in order to record the "record data" onto the recording medium 10, the record data is recorded by the recording apparatus into the data area 11 on the recording medium 10. At that time, the record data is verified in each predetermined block. When imperfection in recording is detected by verifying, it is estimated that there is a defect at the recording position. On the basis of this estimation, the defect management information (the defect list) is made or updated. Then, after a series of operation of recording the record data is ended, the made or updated defect management information is recorded by the recording apparatus into the temporary defect management area 14 on the recording medium 10.

The user can insert the recording medium 10 into or eject it from the recording apparatus many times, which allows the recording of various record data on the recording medium 10. While the user does that many times, in some cases, new dirt is attached onto the recording medium 10. Thus, at each opportunity of recording the record data onto the recording medium 10, the recording apparatus detects a defect existing in the data area 11, updates the defect management information, and records the updated defect management information into the temporary defect management area 14. At this time, because the recording medium 10 is write-once-type (i.e. not rewritable), it cannot overwrite information. Thus, the updated defect management information is recorded into an unrecorded area next to the area of the last recorded defect management information in the temporary defect management area 14, for example. The temporary defect management area 14 is large enough to record the defect management information several times in a row or parallel sequence in an unrecorded area.

When fully recording the record data on the recording medium 10, the user finalizes the recording medium 10. For example, because the recording apparatus has a function of finalizing, the user operates the recording apparatus to finalize the recording medium 10. By the finalize operation of the recording apparatus, the newest defect management information is read out of a plurality of new and old defect management information recorded in the temporary defect management area 14 on the recording medium 10. This information is recorded into the definite defect management area 13 on the recording medium 10.

After that, the user inserts the finalized recording medium 10 into a reproducing apparatus for a general rewritable-type recording medium to reproduce the record data recorded on the recording medium 10. At that time, the reproducing apparatus reads the defect management information recorded in the definite defect management area 13 on the recording medium 10, and reads and reproduces the record data recorded in the data area 11 on the recording medium 10 while referring to the read defect management information. This reproducing apparatus is for a general rewritable-type recording medium, not specially designed for the write-once-type recording medium 10. The recording medium 10, however, has the compatibility with a general rewritable-type recording medium, as described above, so that the record data recorded by the recording apparatus of the present embodiment on the recording medium 10 is accurately reproduced by the reproducing apparatus for the rewritable-type recording medium.

As described above, according to the recording medium 10, the temporary defect management area 14 is placed between the control information recording area 12 and the data area 11, so that the recording medium 10 can ensure the compatibility with a general rewritable-type recording medium although the recording medium 10 is write-once-type. Therefore, the record data recorded on the recording medium 10 can be accurately reproduced by the reproducing apparatus for a general rewritable-type recording medium or the like.

Various Aspects in the Embodiment of Recording Medium

On the recording medium 10 in FIG. 1, the temporary defect management area 14 is placed between the control information recording area 12 placed on the inner circumferential side of the recording medium 10 and the data area 11. However, if there is the control information recording area on the outer circumferential side of the recording medium, the temporary defect management area may be placed between the control information recording area placed on the outer circumferential side of the recording medium and the data area.

Moreover, if there are the control information recording areas on the both inner and outer circumferential sides of the data area on the recording medium, a first temporary defect management area may be placed between the control information recording area placed on the inner circumferential side and the data area, and a second temporary defect management area may be placed between the control information recording area placed on the outer circumferential side and the data area.

Furthermore, if the recording medium is a two-layer disc, it is possible to provide one or a plurality of temporary defect management areas for each layer.

Incidentally, the definite defect management area may be placed not only in the control information recording area placed on the inner circumferential side of the recording medium, but also in the control information recording area placed on the outer circumferential side of the recording medium. Moreover, in the case of the two-layer disc, it is possible to provide one or a plurality of definite defect management areas for each layer.

Each temporary defect management area is preferably large enough to record the defect management information a plurality of times in a row in an unrecorded area, as described above. Moreover, if the defect management information with the same content can be recorded a plurality of times (e.g. twice) redundantly in a row in an unrecorded area in the temporary defect management area, it is possible to increase the recording robustness or certainty of the defect management information. In order to realize this, the temporary defect management area is preferably large enough to record the defect management information a plurality of times in a row or sequentially in an unrecorded area.

First Embodiment of Recording Apparatus

Figure 2:
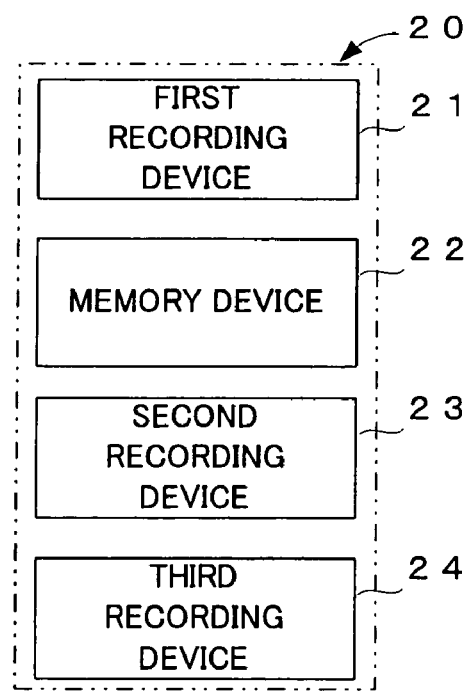
FIG. 2 is a block diagram showing a first embodiment of a recording apparatus of the present invention.

The first embodiment of the recording apparatus of the present invention will be explained. FIG. 2 shows the first embodiment of the recording apparatus of the present invention. A recording apparatus 20 in FIG. 2 is a recording apparatus for recording record data onto a write-once-type recording medium which allows the recording of the record data only once at each position, provided with: (i) a data area to record therein the record data; (ii) a control information recording area to record therein information for controlling the recording and reading in the data area, the control information recording area including a definite defect management area to record therein defect management information of the data area; and (iii) a temporary defect management area to temporarily record therein the defect management information of the data area, the temporary defect management area being placed between the control information recording area and the data area. For example, the recording apparatus 20 is intended to record the "record data" onto the above-described recording medium 10.

As shown in FIG. 2, the recording apparatus 20 is provided with: a first recording device 21; a memory device 22; a second recording device 23; and a third recording device 24.

The first recording device 21 records the record data into the data area. If the recording medium is an optical disc, the first recording device 21 can be realized by an optical pickup, a controller for controlling the optical pickup, and the like. Incidentally, if the recording medium is an optical-type, the optical pickup is preferably used as a device for directly recording data or information onto the recording medium. However, if the recording medium is other types, such as magnetic, magneto optical, and a type of using the change of a dielectric constant, it is possible to use a pickup, a head, a probe, or the like, which is appropriate for the type of the recording medium.

The memory device 22 stores therein the defect management information. The memory device 22 can be realized by a memory or the like, for example.

The second recording device 23 records the defect management information stored in the memory device 22, into the temporary defect management area. If the recording medium is an optical disc, the second recording device 23 can be realized by an optical pickup, a controller for controlling the optical pickup, and the like.

The third recording device 24 records the defect management information stored in the memory device 22, into the definite defect management area. If the recording medium is an optical disc, the third recording device 24 can be realized by an optical pickup, a controller for controlling the optical pickup, and the like.

Incidentally, a plurality of sets of hardware, which constitute the first, second, or third recording device, may be provided individually, but usually, one set is enough. For example, it is enough to provide one optical pickup, one controller, and three software for controlling the controller corresponding to the relative recording devices.

Hereinafter, the operation of the recording apparatus 20 will be explained. The first recording device 21 records the record data into the data area on the write-once-type recording medium. In the recording apparatus 20, when the defect management information including the defect list for indicating the position of a defect on the write-once-type recording medium or the like is made or obtained through the recording medium or other communication lines, the memory device 22 stores therein this defect management information. The second recording device 23 records the defect management information stored in the memory device 22, into the temporary defect management area on the recording medium. There may be various choices of times the second recording device 23 records the defect management information into the temporary defect management area. For example, conceivable choices are as follows: e.g., immediately after the recording medium is initialized or formatted; immediately after one series of record data is recorded onto the recording medium; or the like. The third recording device 24 records the defect management information stored in the memory device 22, into the definite defect management area on the recording medium. There may be various choices of times the third recording device 24 records the defect management information into the definite defect management area. For example, a conceivable choice is when the recording medium is finalized, or the like.

In the recording medium, which is the object of the recording by the recording apparatus 20, as is the case with the recording medium 10 described above, it is possible to reserve or ensure the temporary defect management area without extending the control information recording area and without placing it in the data area, by placing the temporary defect management area between the control information recording area and the data area. Thus, it is possible to ensure the compatibility between the write-once-type recording medium and the rewritable-type recording medium. Then, the second recording device 23 of the recording apparatus 20 can record the defect management information into this temporary defect management area. Therefore, it is possible to realize the defect management in the write-once-type recording medium while maintaining the compatibility between the write-once-type recording medium and the rewritable-type recording medium.

Moreover, as is the case with the recording medium 10 described above, the recording medium, which is the object of the recording by the recording apparatus 20, adopts a recording structure in common with the rewritable-type recording medium, by placing the definite defect management area in the control information recording area. Then, the third recording device 24 of the recording apparatus 20 can record the defect management information into this definite defect management area. Therefore, it is possible to match the area in which the defect management information is recorded on the write-once-type recording medium and the area in which the defect management information is recorded on the rewritable-type recording medium. It is also possible to realize the compatibility between the write-once-type recording medium and the rewritable-type recording medium.

In the meanwhile, the defect management information includes the defect list at least including information for indicating the position of a defect in the data area on the recording medium. However, not only the information for indicating the position of a defect in the data area, but also the following information may be included in the defect management information. Namely, (a) definition information for indicating the position of the data area; and (b) a defect list including the defect position information for indicating the position of a defect in the data area and the spare area position information for indicating the position of the spare area at which the record data to be recorded at the position of the defect is alternatively recorded, may be included in the defect management information.

In general, position information for indicating the position of the data area is recorded in the defect management area in the control information recording area on the existing rewritable-type recording medium. A reproducing apparatus for the rewritable-type recording medium reads this position information and recognizes the position of the data area on the recording medium. If so, the write-once-type recording medium can be reproduced by the reproducing apparatus for the rewritable-type recording medium, by recording the information of the same type of this position information in the definite defect management area on the write-once-type recording medium, which is the object of the recording by the recording apparatus 20. Thus, in the embodiment, the definition information for indicating the position of the data area is included in the defect management information, and this defect management information is recorded by the third recording device 24 in the definite defect management area. Therefore, the write-once-type recording medium for which the finalizing is ended and on which the defect management information is recorded by the third recording device 24 in the definite defect management area, can be reproduced by the reproducing apparatus for the rewritable-type recording medium.

The reproducing apparatus for the rewritable-type recording medium reads the definition information recorded in the definite defect management area on the write-once-type recording medium and recognizes the position of the data area on the write-once-type recording medium on the basis of this definition information. Therefore, logically speaking, if the position information is eventually recorded as the definition information in the definite defect management area, it is possible to arbitrarily set the position of the data area on the write-once-type recording medium (although there are limitations by a standard or the like in practice). If so, for example, when the write-once-type recording medium is initialized or formatted, it is possible to reserve the temporary defect management area to be large, and by just much, the start address of the data area can be also shifted backward. This makes it possible to reserve the temporary defect management area to be large while maintaining the compatibility about the reproduction of the write-once-type recording medium and the rewritable-type recording medium.

Second Embodiment of Recording Apparatus

Figure 3:
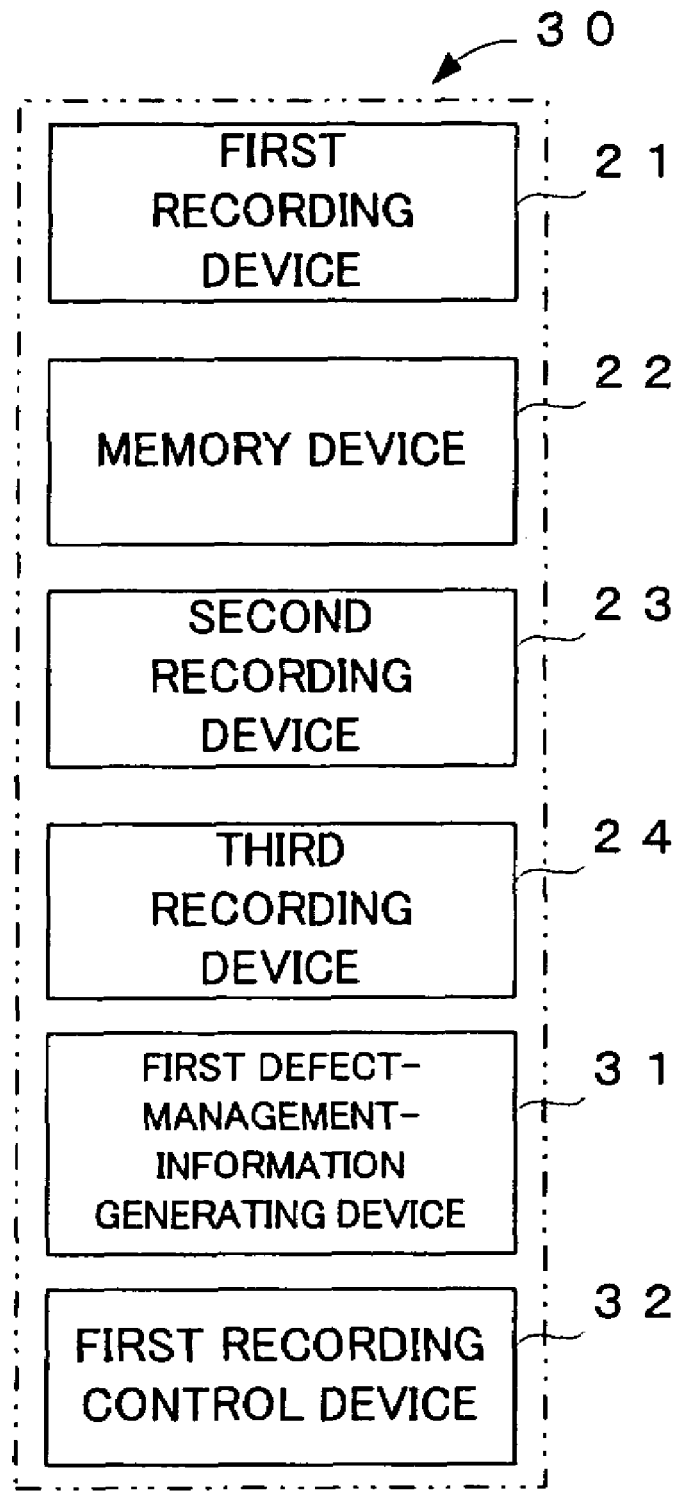
FIG. 3 is a block diagram showing a second embodiment of a recording apparatus of the present invention.

The second embodiment of the recording apparatus of the present invention will be explained. FIG. 3 shows the second embodiment of the recording apparatus of the present invention. A recording apparatus 30 in FIG. 3 is provided with: the first recording device 21; the memory device 22; the second recording device 23; and the third recording device 24, as with the recording apparatus 20. The recording apparatus 30 is also provided with: a first defect-management-information generating device 31; and a first recording control device 32.

The first defect-management-information generating device 31 generates or makes the defect management information with respect to the recording medium on which the record data is unrecorded, and lets the memory device 22 store therein this information.

The first recording control device 32 controls the second recording device 23 to record the defect management information into the temporary defect management area when the defect management information is generated by the first defect-management-information generating device 31.

Hereinafter, the operation of the recording apparatus 30 will be explained. For example, when the write-once-type recording medium is initialized or formatted, the first defect-management-information generating device 31 generates the defect management information with respect to the recording medium on which the record data is unrecorded.

When the defect management information is generated by the first defect-management-information generating device 31, the first recording control device 32 controls the second recording device 23 to record the defect management information into the temporary defect management area. The timing at which the first recording control device 32 controls the second recording device 23 to record the defect management information into the temporary defect management area may be as follows: e.g., while the defect management information is being generated by the first defect-management-information generating device 31; immediately after the generation of the defect management information is ended; or further, shortly after the generation of the defect management information is ended.

As described above, according to the recording apparatus 30, it can record and maintain the defect management information generated upon initializing or formatting the recording medium, in the temporary defect management area on the recording medium.

Third Embodiment of Recording Apparatus

Figure 4:
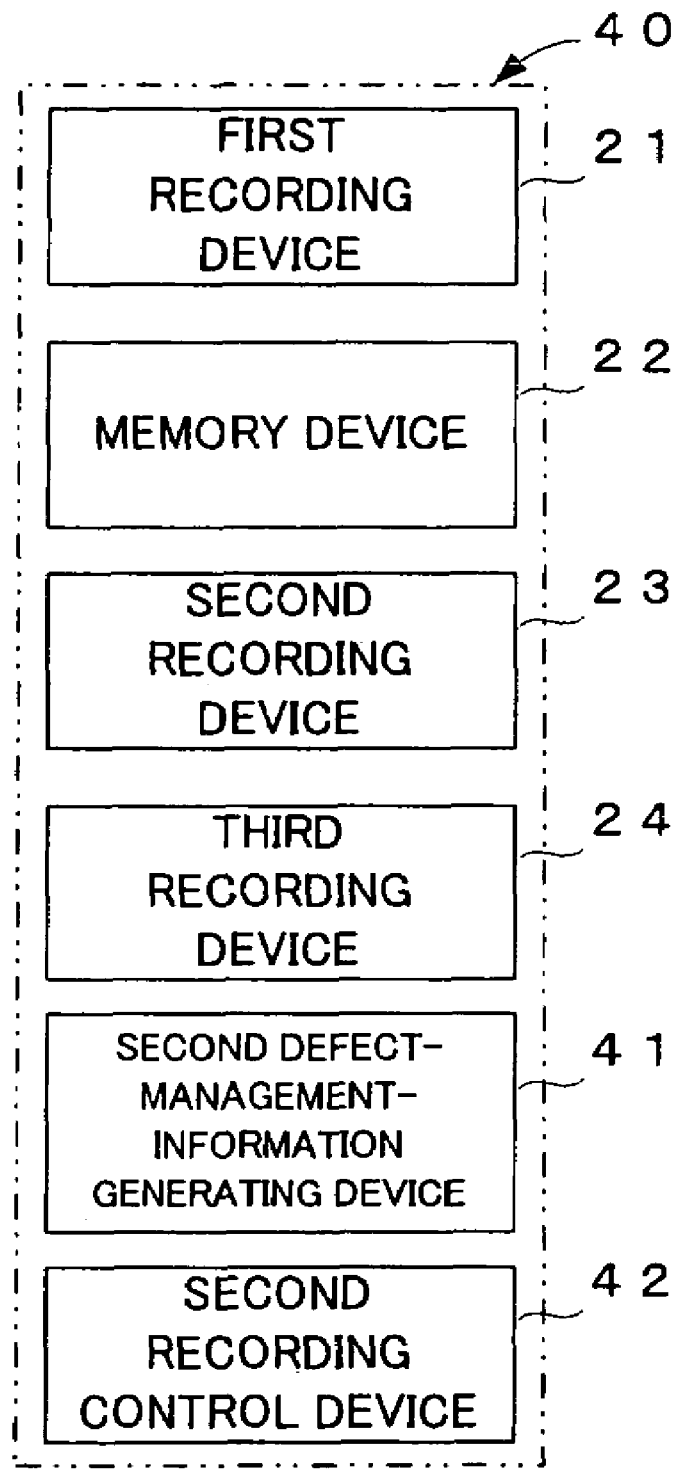
FIG. 4 is a block diagram showing a third embodiment of a recording apparatus of the present invention.

The third embodiment of the recording apparatus of the present invention will be explained. FIG. 4 shows the third embodiment of the recording apparatus of the present invention. A recording apparatus 40 in FIG. 4 is provided with: the first recording device 21; the memory device 22; the second recording device 23; and the third recording device 24, as with the recording apparatus 20. The recording apparatus 40 is also provided with: a second defect-management-information generating device 41; and a second recording control device 42.

The second defect-management-information generating device 41 generates or updates the defect management information when the record data is recorded by the first recording device 21 into the data area, and lets the memory device 22 store therein this information.

The second recording control device 42 controls the second recording device 23 to record the defect management information into the temporary defect management area when the defect management information is generated or updated by the second defect-management-information generating device 41.

Hereinafter, the operation of the recording apparatus 40 will be explained. For example, upon recording the record data into the data area, the recording apparatus 40 records the record data for each predetermined block and verifies at each time of recording in one block. The second defect-management-information generating device 41 uses the result of the verifying, for example. It generates or updates the defect management information, and stores this information into the memory device 22. As described above, it can generate or update the defect management information upon recording the record data, and reflect a defect in the data area to the defect management information upon reproducing.

When the defect management information is generated or updated by the second defect-management-information generating device 41, the second recording control device 42 controls the second recording device 23 to record the defect management information into the temporary defect management area. The timing at which the second recording control device 42 controls the second recording device 23 to record the defect management information into the temporary defect management area may be as follows: e.g., while the defect management information is being generated by the second defect-management-information generating device 41; immediately after the generation of the defect management information is ended; or further, shortly after the generation of the defect management information is ended.

As described above, according to the recording apparatus 40, it can reflect a defect in the data area upon reproducing, record this defect management information into the temporary defect management area, and maintain this information.

Fourth Embodiment of Recording Apparatus

Figure 5:
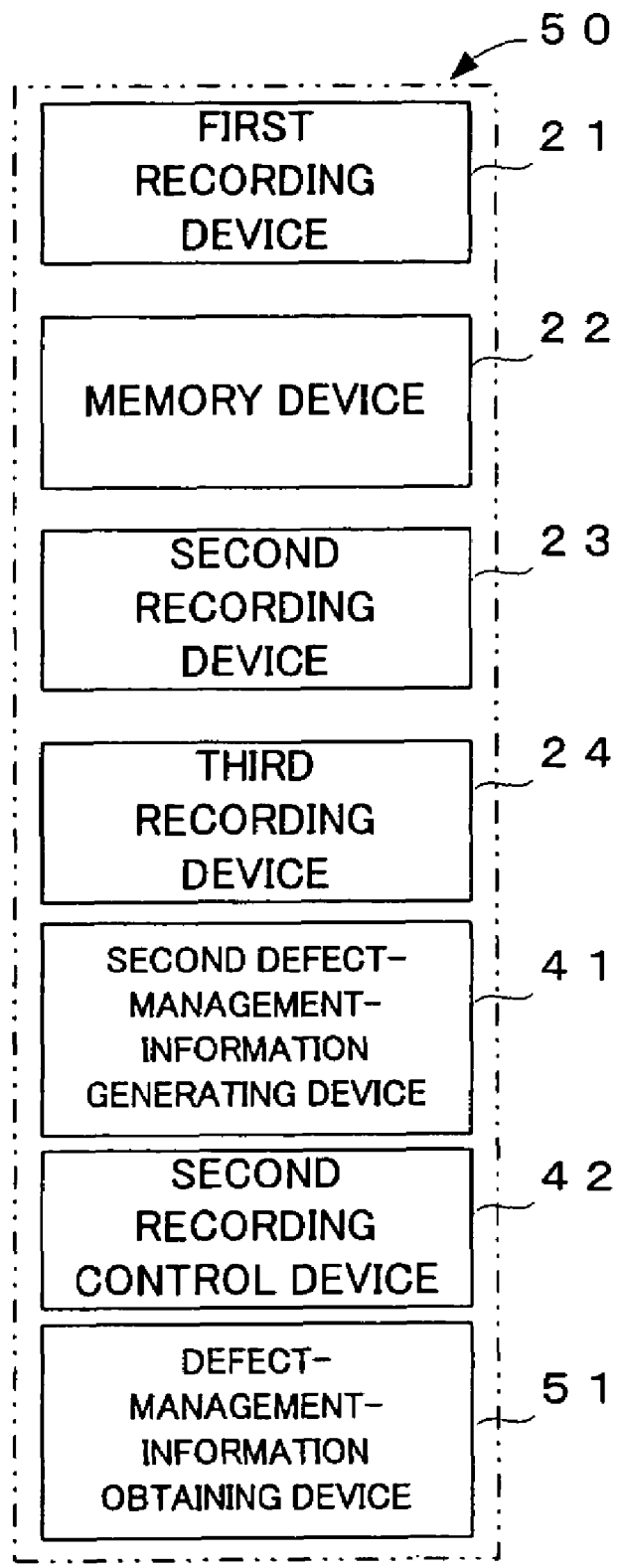
FIG. 5 is a block diagram showing a fourth embodiment of a recording apparatus of the present invention.

The fourth embodiment of the recording apparatus of the present invention will be explained. FIG. 5 shows the fourth embodiment of the recording apparatus of the present invention. A recording apparatus 50 in FIG. 5 is provided with: the first recording device 21; the memory device 22; the second recording device 23; the third recording device 24; the second defect-management-information generating device 41; and the second recording control device 42, as with the recording apparatus 40. The recording apparatus 50 is also provided with: a defect-management-information obtaining device 51.

The defect-management-information obtaining device 51 reads the defect management information from the temporary defect management area on the recording medium, and stores this information into the memory device 22.

Hereinafter, the operation of the recording apparatus 50 will be explained. For example, if the defect management information is already recorded in the temporary defect management area on the recording medium inserted in the recording apparatus 50, the defect-management-information obtaining device 51 reads the defect management information from the temporary defect management area and stores this information into the memory device 22. Then, the second defect-management-information generating device 41 updates the defect management information stored in the memory device 22 by the defect-management-information obtaining device 51 when the record data is recorded into the data area by the first recording device 21. Then, the second recording control device 42 records the defect management information into the temporary defect management area when the defect management information is updated.

As described above, according to the recording apparatus 50, it can update this defect management information on the basis of the defect management information recorded and maintained in the temporary defect management area in the past. It can also record and maintain the updated defect management information in the temporary defect management area. This makes it possible to reflect a defect newly formed in the data area to the defect management information, and to maintain this information in the temporary defect management area on the recording medium.

Fifth Embodiment of Recording Apparatus

Figure 6:
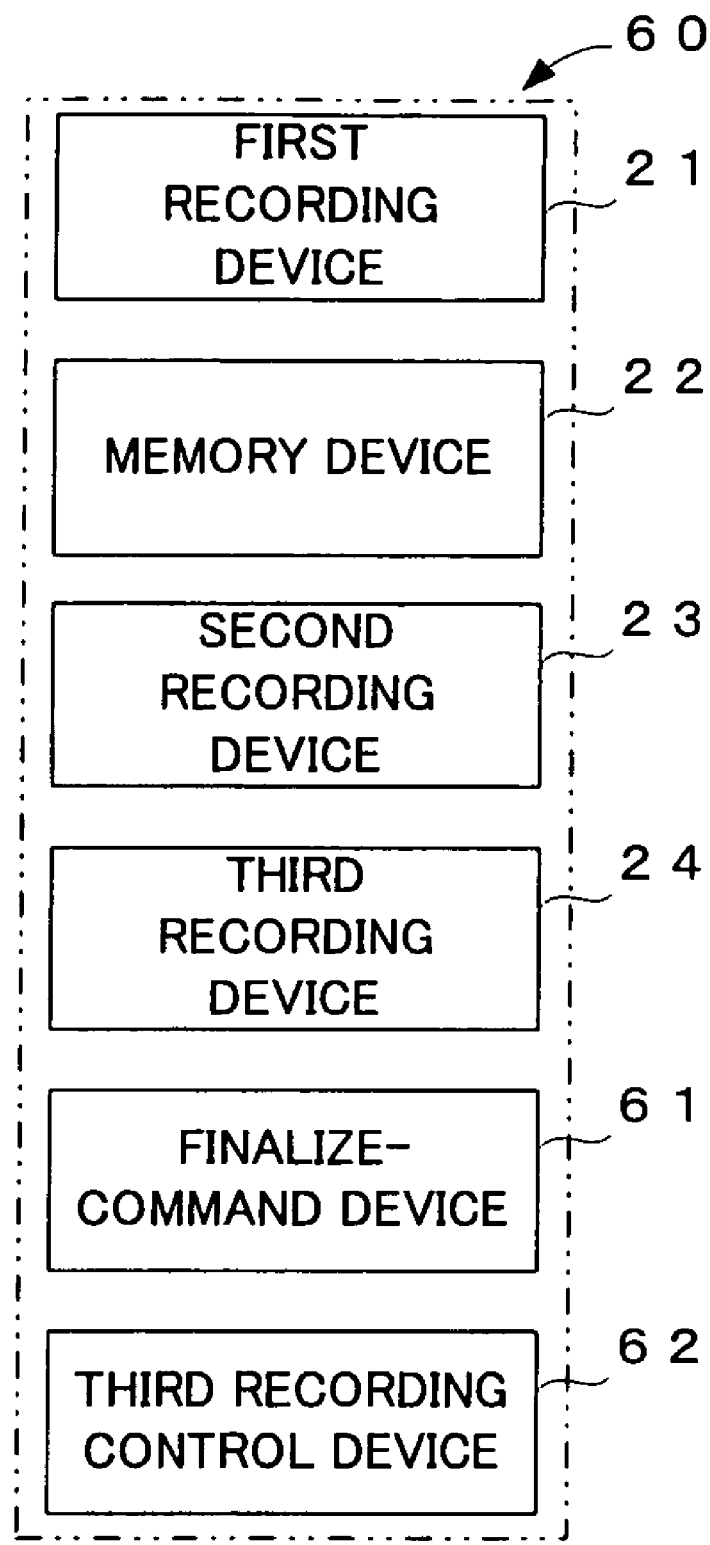
FIG. 6 is a block diagram showing a fifth embodiment of a recording apparatus of the present invention.

The fifth embodiment of the recording apparatus of the present invention will be explained. FIG. 6 shows the fifth embodiment of the recording apparatus of the present invention. A recording apparatus 60 in FIG. 6 is provided with: the first recording device 21; the memory device 22; the second recording device 23; and the third recording device 24, as with the recording apparatus 20. The recording apparatus 60 is also provided with: a finalize-command device 61; and a third recording control device 62.

The finalize-command device 61 gives a command for indicating to finalize the recording medium. The finalizing includes an operation of maintaining or arranging a recording format on the recording medium after completing the recording of the record data on the recording medium on the basis of a recording state of the record data recorded at that stage. In general, the finalizing is performed in the case where the rewritable-type recording medium is adapted to the recording format of a recording medium of a reproduce only type (i.e., ROM-type). The finalizing on the recording apparatus 60 is performed mainly to adapt the write-once-type recording medium to the recording format of the rewritable-type recording medium or the recording medium of a reproduce only type.

The third recording control device 62 controls the third recording device 24 to record the defect management information stored in the memory device 22, into the definite defect management area when the command for indicating to finalize is given by the finalize-command device 61.

Hereinafter, the operation of the recording apparatus 60 will be explained. For example, when a user wants to reproduce the record data recorded on the recording medium with the reproducing apparatus for the rewritable-type recording medium or a reproducing apparatus for the recoding medium of a reproduce only type, the user inputs an instruction for indicating to finalize to the recording apparatus 60. In response to this input, the finalize-command device 61 gives a command for indicating to finalize the recording medium currently inserted in the recording apparatus 60. The embodiment may be constructed as follows: when the recording apparatus 60 judges that the data area of the recording medium is filled with the record data and that it is not preferable to record more record data, the recording apparatus 60 performs the finalizing automatically. If such a construction is taken, the finalize-command device 61 gives a command for indicating to finalize the recording medium in response to the judgment described above of the recording apparatus 60.

The third recording control device 62 controls the third recording device 24 to record the defect management information stored in the memory device 22 into the definite defect management area when the command for indicating to finalize is given by the finalize-command device 61. As a result, the defect management information is recorded into the definite defect management area of the recording medium after the recording medium is finalized. This allows the compatibility between the write-once-type recording medium and the rewritable-type recording medium and allows the reproduction of the write-once-type recording medium with the reproducing apparatus for the rewritable-type recording medium.

As described above, according to the recording apparatus 60, the defect management information can be recorded into the definite defect management area upon the finalizing, and this allows the compatibility between the write-once-type recording medium and the rewritable-type recording medium. The finalizing is performed mostly when the user thinks the recording of the record data is completed. Therefore, by using the opportunity of finalizing and recording the defect management information into the definite defect management area, it is possible to establish the compatibility between the write-once-type recording medium and the rewritable-type recording medium at a timing in line with the user's intention or will.

Various Aspects in the Embodiments of Recording Apparatus

Various aspects in the embodiments of the recording apparatus will be explained. The first generating device 31 for generating the defect management information or the second generating device 41 for generating the defect management information may comprise: a defect-detecting device for detecting a defect in the data area; and a reserving device for reserving or ensuring the spare area corresponding to the defect in the data area. This allows the making of the defect list.

Moreover, the finalize-command device 61 may give a command for indicating to finalize in response to an eject command. When a user wants to reproduce the record data recorded on the recording medium with another reproducing apparatus, the user ejects the recording medium from the recording apparatus. Thus, it is preferable to construct the embodiment such that the finalizing is performed in response to the eject command given when the recording medium is ejected from the recording apparatus and then the defect management information is recorded into the definite defect management area. This makes it possible to establish the compatibility between the write-once-type recording medium and the rewritable-type recording medium in line with the user's will.

Moreover, the defect management information may be recorded by the second recording device 23 repeatedly at a plurality of times in an unrecorded area in the temporary defect management area. For example, at one opportunity of the recording operation, the defect management information with the same content is recorded repeatedly at a plurality of times in the unrecorded area in the temporary defect management area. This makes it possible to surely maintain the defect management information on the recording medium before the finalizing, for example.

Moreover, the defect management information may be recorded by the third recording device 24 repeatedly at a plurality of times in an unrecorded area in the definite defect management area. For example, at one opportunity of the recording operation, the defect management information with the same content is recorded repeatedly at a plurality of times in the unrecorded area in the definite defect management area. This makes it possible to surely maintain the defect management information on the recording medium after the finalizing, for example.

Moreover, the defect management information may be recorded by the second recording device 23 redundantly in a plurality of temporary defect management areas present at a plurality of positions on the recording medium. Namely, in the case where there are a plurality of temporary defect management areas on the recording medium, which is the object of the recording by the recording apparatus, e.g., the case where the areas are on the inner circumferential side and the outer circumferential side of a disc or the case where the areas are on relative layers of a two-layer disc, the defect management information with the same content is recorded redundantly in each of the plurality of temporary defect management areas. This makes it possible to surely maintain the defect management information on the recording medium before the finalizing, for example.

Moreover, the defect management information may be recorded by the third recording device 24 redundantly in a plurality of definite defect management areas present at a plurality of positions on the recording medium. This makes it possible to surely maintain the defect management information on the recording medium after the finalizing, for example.

Furthermore, any one of the recording apparatuses 20 to 60 may be further provided with an area setting device for setting the area (e.g., the areal size) of the temporary defect management area and setting the position of the data area depending on this set area of the temporary defect management area. For example, if the temporary defect management area is set to be large, more defect management information can be recorded in the temporary defect management area. Namely, in this case, the defect management information can be recorded in a row in an unrecorded area many times, so that each defect management information can be recorded and maintained even if the updating is performed many times. Therefore, it is possible to maintain or increase the reliability of the recording and reproducing of the record data even when the recording medium is used in a bad environment in which a defect occurs often. Moreover, if the temporary defect management area is set to be large, it is possible to increase the number of the defect management information with the same content which is recorded repeatedly or redundantly. Therefore, it is possible to increase the robustness or certainty of recording and maintaining the defect management information. On the other hand, if the temporary defect management area is set to be small or narrow, it is possible to ensure the data area to be large by just that much. Therefore, it is possible to increase the substantial recording capacity of the recording medium. If setting the range of the temporary defect management area by the area setting device is entrusted to a user, it is possible to appropriately set the temporary defect management area depending on the user's using aspects of the recording medium.

First Embodiment of Reproducing Apparatus

Figure 7:
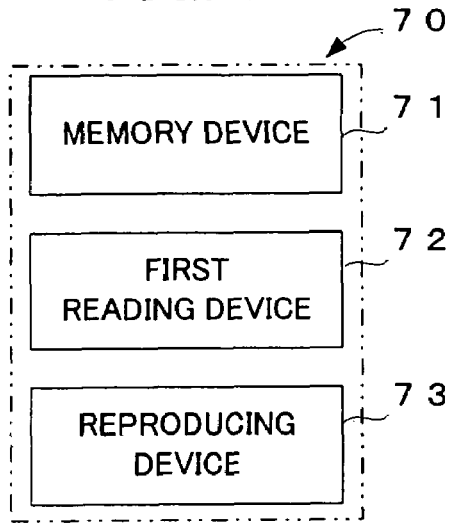
FIG. 7 is a block diagram showing a first embodiment of a reproducing apparatus of the present invention.

The first embodiment of the reproducing apparatus of the present invention will be explained. FIG. 7 shows the first embodiment of the reproducing apparatus of the present invention. A reproducing apparatus 70 in FIG. 7 is a reproducing apparatus for reproducing record data recorded on the above described write-once-type recording medium of the embodiment of the present invention. For example, the reproducing apparatus 70 reproduces the record data recorded on the above-described recording medium 10.

As shown in FIG. 7, the reproducing apparatus 70 is provided with: a memory device 71; a first reading device 72; and a reproducing device 73.

The first reading device 72 reads the defect management information recorded in the temporary defect management area and stores this information into the memory device 22. For example, if the recording medium is an optical-type, the first reading device 72 is provided with an optical pickup and a controller for controlling the optical pickup.

The reproducing device 73 reproduces the record data recorded in the data area on the basis of the defect management information stored in the memory device 71. For example, if the record data is image data, the reproducing device 73 is provided with a decoder for converting the image data to an image signal displayable on a display.

Hereinafter, the operation of the reproducing apparatus 70 will be explained. For example, when the write-once-type recording medium, like the recording medium 10, which is the object of the reproduction by the reproducing apparatus 70 is inserted or loaded in the reproducing apparatus 70, the first reading device 72 reads the defect management information recorded in the temporary defect management area and stores this information into the memory device 71. Upon recording, the record data is recorded so as to avoid a defect in the data area of the recording medium. Therefore, in order to reproduce the record data recorded in this manner, it is necessary to recognize the position of a defect in the data area upon the reproducing. When reproducing the record data, the reproducing device 73 refers to the defect list included in the defect management information and recognizes the position of a defect in the data area on the basis of this defect list. It also recognizes the recording position of the record data recorded so as to avoid the defect and reproduces the record data.

As described above, according to the reproducing apparatus 70, it is possible to surely reproduce the record data recorded on the recording medium while performing the defect management using the defect management information recorded in the temporary defect management area placed between the control information recording area and the data area.

In the meanwhile, the defect management information includes the defect list at least including information for indicating the position of a defect in the data area on the recording medium. However, not only the information for indicating the position of a defect in the data area, but also the following information may be included in the defect management information. Namely, the defect list including: (a) the definition information for indicating the position of the data area; (b) the defect position information for indicating the position of a defect in the data area; and (c) the spare area position information for indicating the position of the spare area in which the record data to be recorded at the position of the defect is alternatively recorded, may be included in the defect management information.

Second Embodiment of Reproducing Apparatus

Figure 8:
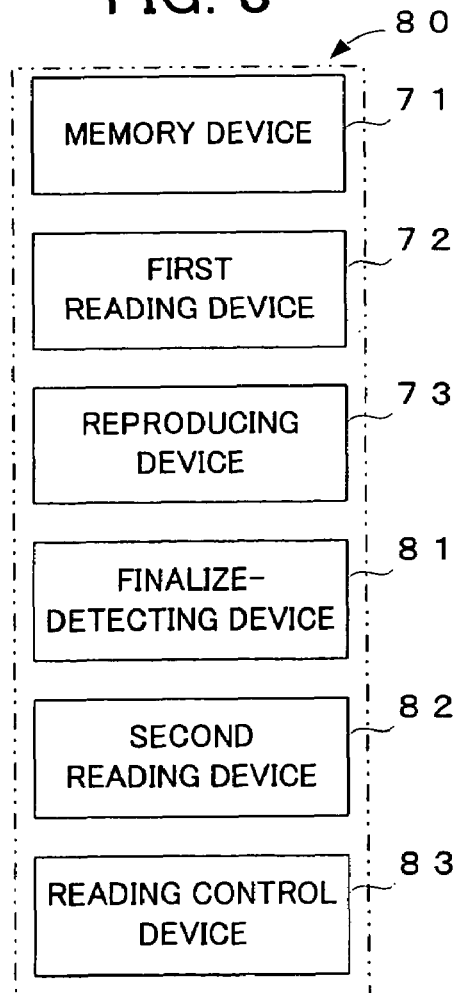
FIG. 8 is a block diagram showing a second embodiment of a reproducing apparatus of the present invention.

The second embodiment of the reproducing apparatus of the present invention will be explained. FIG. 8 shows the second embodiment of the reproducing apparatus of the present invention. A reproducing apparatus 80 in FIG. 8 is provided with: the memory device 71; the first reading device 72; and the reproducing device 73 as with the reproducing apparatus 70. The reproducing apparatus 80 is also provided with: a finalize-detecting device 81; a second reading device 82; and a reading control device 83.

The finalize-detecting device 81 detects whether of not the recording medium is already finalized. Whether or not to be already finalized can be judged by checking the control information recorded in the control information recording area on the recording medium, for example.

The second reading device 82 reads the defect management information recorded in the definite defect management area and stores this information into the memory device 71. For example, if the recording medium is an optical-type, the second reading device 82 is provided with an optical pickup and a controller for controlling the optical pickup.

The reading control device 83 uses the second reading device 82 to read the defect management information recorded in the definite defect management area and stores this information into the memory device 71 when it is detected that the recording medium is already finalized on the basis of a detection result by the finalize-detecting device 81. The reading control device 83 uses the first reading device 72 to read the defect management information recorded in the temporary defect management area and stores this information into the memory device 71 when it is detected that the recording medium is not finalized yet.

Hereinafter, the operation of the reproducing apparatus 80 will be explained. The reproducing apparatus 80 reads either the defect management information recorded in the temporary defect management area or the defect management information recorded in the definite defect management area, stores this information into the memory device 71, and reproduces the record data while performing the defect management on the basis of the defect management information stored in the memory device 71.

Which defect management information is read out of the defect management information recorded in the temporary defect management area or the defect management information recorded in the definite defect management area is judged on the basis of whether or not the recording medium is already finalized. In order to realize this judgment, firstly, the finalize-detecting device 81 detects whether or not the recording medium is already finalized. Then, on the basis of this detection result, when it is detected that the recording medium is already finalized, the reading control device 83 uses the second reading device 82 to read the defect management information recorded in the definite defect management area and stores this information into the memory device 71. On the other hand, when it is detected that the recording medium is not finalized yet, the reading control device 83 uses the first reading device 72 to read the defect management information recorded in the temporary defect management area and stores this information into the memory device 71.

As described above, before the recording medium is finalized, the defect management information is recorded in the temporary defect management area. Therefore, if the recording medium, which is the object of reproduction, is not finalized yet, the defect management information is read from the temporary management area, and this information is used for the defect management and the reproduction of the record data on the reproducing apparatus 80. On the other hand, after the recording medium is finalized, the defect management information is recorded in the definite defect management area. Therefore, if the recording medium, which is the object of reproduction, is already finalized, the defect management information is read from the definite management area, and this information is used for the defect management and the reproduction of the record data on the reproducing apparatus 80.

As described above, according to the reproducing apparatus 80, it is determined which information is used, the defect management information recorded in the temporary defect management area or the defect management information recorded in the definite defect management area, on the basis of whether or not the recording medium is already finalized. Thus, depending on the situation of the recording medium, it is possible to perform the defect management and reproduce the record data by using the newest defect management information. That is because, as described above, the defect management information recorded in the definite defect management area by the finalizing is the newest defect management information made or updated upon the finalizing or immediately before the finalizing. Therefore, it is possible to increase the reliability of the reproducing of the record data.

Incidentally, the embodiments of recording apparatus and reproducing apparatus described above may be realized in an integral form with hardware as an exclusive apparatus or may be realized by making a computer read a program.

Embodiment of Recording Method

The embodiment of a recording method of the present invention will be explained. The recording method of the present invention is a recording method of recording record data onto the above described write-once-type recording medium of the embodiment of the present invention, the recording method being provided with: a first recording process of recording the record data into the data area; a defect-management-information generating process of generating or updating the defect management information; a second recording process of recording the defect management information generated or updated in the defect-management-information generating process, into the temporary defect management area; a finalize-command process of giving a command for indicating to finalize the recording medium; and a third recording process of recording the defect management information generated or updated in the defect-management-information generating process, into the definite defect management area in case that the command for indicating to finalize is given in the finalize-command process.

In the recording method in the embodiment, at a stage before the recording medium is finalized, the defect management information is recorded into the temporary defect management area in the second recording process. The temporary defect management area is placed between the control information recording area and the data area and is relatively large. Thus, even if the defect management information is updated a plurality of times, the updated defect management information can be recorded and maintained on the recording medium at each time. When the recording medium is finalized, the defect management information is recorded into the definite defect management area in the third recording process. The definite defect management area is placed in the control information recording area, and in this regard it is in common with the rewritable-type recording medium in this point. Therefore, the defect management information recorded in the definite defect management area can be reproduced by the reproducing apparatus for the rewritable-type recording medium.

As described above, according to the recording method in the embodiment, it is possible to realize the compatibility between the write-once-type recording medium and the rewritable-type recording medium.

Embodiment of Reproducing Method

The embodiment of a reproducing method of the present invention will be explained. A reproducing method of reproducing record data recorded on the above described write-once-type recording medium of the embodiment of the present invention, the reproducing method being provided with: a detecting process of detecting whether or not the recording medium is already finalized; a first reading process of reading the defect management information recorded in the temporary defect management area and storing this information into the memory device in case that the recording medium is not finalized; a second reading process of reading the defect management information recorded in the definite defect management area and storing this information into the memory device in case that the recording medium is finalized; and a reproducing process of reproducing the record data recorded in the data area on the basis of the defect management information stored in the memory device.

In the recording method described above, before the recording medium is finalized, the defect management information is recorded into the temporary defect management area. On the other hand, if the recording medium is finalized, the defect management information is recorded into the definite defect management area. In the reproducing method of reproducing the recording medium, if the recording medium is not finalized yet, the defect management information is read from the temporary defect management area in the first reading process. On the other hand, if the recording medium is already finalized, the defect management information is read from the definite defect management area in the second reading process. In the reproducing process, the record data is reproduced with the defect management performed, on the basis of the defect management information which is read in any one of the reading processes and which is stored in the memory device.

As described above, according to the reproducing method in the embodiment of the present invention, it is possible to perform the defect management and reproduce the record data by using the newest defect management information.

EXAMPLES

Examples of the present invention will be hereinafter explained with reference to the drawings. The examples below show that the write-once-type recording medium of the present invention is applied to a write-once-type optical disc and that the recording apparatus and the reproducing apparatus of the present invention are applied to a recording/reproducing apparatus for the write-once-type optical disc.

Example of Recording Medium

Figure 9:
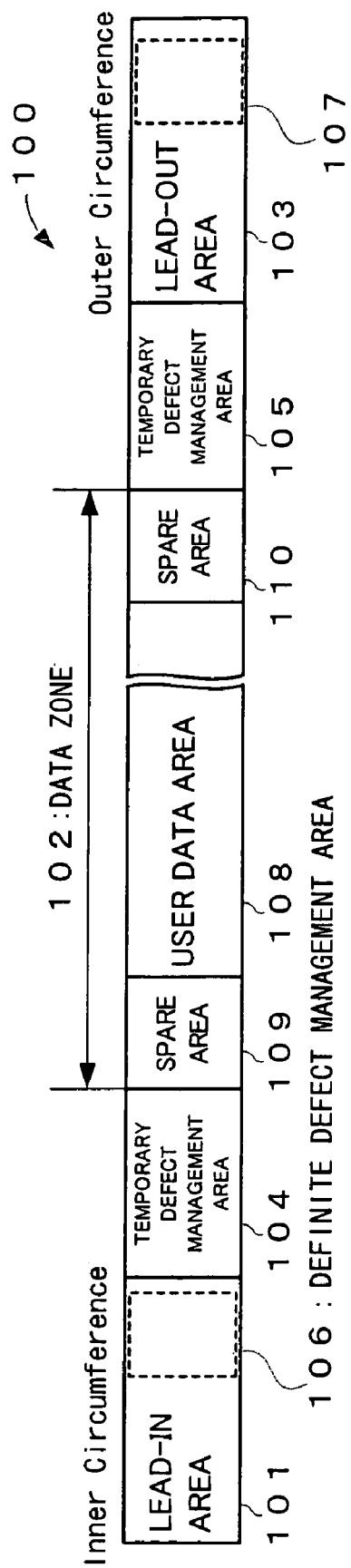
FIG. 9 is an explanatory diagram showing an example of a write-once-type recording medium of the present invention.

Firstly, the recording structure of the write-once-type optical disc in the example of the present invention, and information and data recorded on the optical disc will be explained. FIG. 9 shows the write-once-type recording medium which is the example of the present invention. Incidentally, the left side of FIG. 9 is the inner circumferential side of a write-once-type optical disc 100, and the right side of FIG. 9 is the outer circumferential side of the optical disc 100.

As shown in FIG. 9, there are a lead-in area 101 which is the control information recording area on the inner circumferential side, a data zone 102 on the outer circumferential side of the lead-in area 101, and a lead-out area 103 which is the control information recording area on the outer circumferential side of the data zone 102 on a recording surface of the optical disc 100. A first temporary defect management area 104 is placed between the lead-in area 101 and the data zone 102. A second temporary defect management area 105 is placed between the data zone 102 and the lead-out area 103.

In both the lead-in area 101 and the lead-out area 103, control information for controlling and management information for managing the recording and reading of information or data on the optical disc 100 are recorded. The lead-in area 101 is provided with a definite defect management area 106. The lead-out area 103 is provided with a definite defect management area 107. In both the defect management areas 106 and 107, defect management information 120 (refer to FIG. 10) is recorded.

The data zone 102 corresponds to the above-described data area 11 shown in FIG. 1. The data zone 102 is provided with: a user data area 108; and spare areas 109 and 110 on the inner and outer circumferential sides of the user data area 108, respectively. The user data area 108 is a main area to record the "record data", such as image data, audio data, and contents data. The spare areas 109 and 110 are intended to evacuate the record data from a defect in the user data area 108. Namely, when there is a defect in the user data area 108, the record data to be recorded or already recorded at the position of the defect is alternatively recorded into the spare area 109 or 110.

In the both the temporary defect management areas 104 and 105, the defect management information 120 is recorded temporarily. Incidentally, the defect management information 120 is also recorded in the definite defect management areas 106 and 107. The difference between the definite defect management areas 106 and 107 and the temporary defect management areas 104 and 105 will be described later.

Next, the defect management information 120 will be explained. The defect management information 120 is used for the defect management performed by a recording/reproducing apparatus 200 (refer to FIG. 14). The recording/reproducing apparatus 200 performs the defect management when recording the record data onto the optical disc 100 or when reproducing the record data from the optical disc 100. In the example, the defect management is mainly as follows. When there is a defect, such as scratches, dusts, or deterioration, on the user data area on the optical disc 100, the record data is recorded away from the position of the defect. At the same time, the record data to be originally recorded or already recorded at the position of the defect is recorded into the spare area 109 or 110. Moreover, the following operations are also performed as a part of the defect management: an operation of recognizing the position of a defect upon reproducing the record data recorded in the user data area 108 and an operation of reading from the spare area 109 or 110 the record data to be originally recorded or already recorded at the position of the defect. In order to perform such a defect management, the recording/reproducing apparatus 200 needs to recognize the position of a defect in the user data area 108. The defect management information 120 is mainly used for the recording/reproducing apparatus 200 to recognize the position of a defect.

Figures 10, 11:
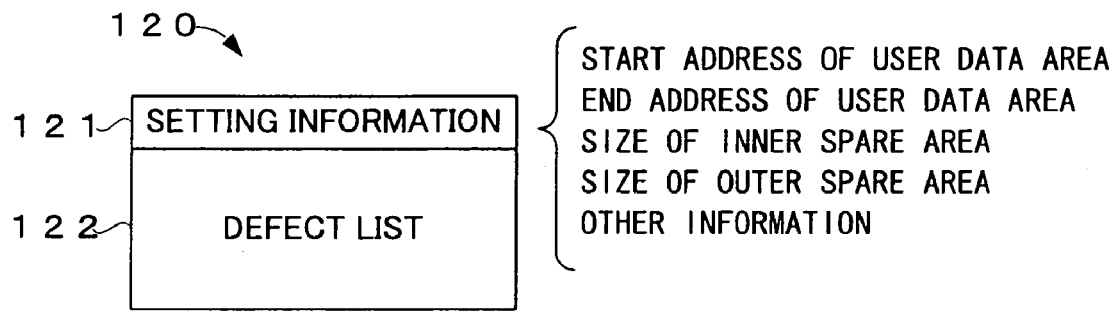
FIG. 10 is an explanatory diagram showing the content of defect management information in the example.
FIG. 11 is an explanatory diagram showing one example of a defect list in the example.

FIG. 10 shows the content of defect management information 120. As shown in FIG. 10, setting information 121 and a defect list 122 are included in the defect management information 120.

The setting information 121 includes: a start address of the user data area 108; an end address of the user data area 108; the size of the inner spare area 109; the size of the outer spare area 110; and other information, as shown in FIG. 10.

FIG. 11 shows the content of the defect list 122. As shown in FIG. 11, on the defect list 122, there are recorded an address for indicating the position of a defect in the user data area 108 (which is hereinafter referred to as a "defect address"), an address for indicating the recording position in the spare area 109 or 110 of the record data to be recorded or already recorded at the position of the defect (which is hereinafter referred to as a "spare address"); and other information. When there are a plurality of defects in the user data area 108, a plurality of defect addresses and spare areas corresponding to the defects are recorded on the defect list 122.

Incidentally, the defect management can be performed not only for the user data area 108 on the optical disc 100 but also for the entire recording surface of the optical disc 100.

Next, an aspect about recording of the defect management information 120 will be explained. The temporary defect management areas 104 and 105 on the optical disc 100 and the definite defect management areas 106 and 107 are all intended to record therein the defect management information 120. However, The temporary defect management areas 104 and 105 on the optical disc 100 and the definite defect management areas 106 and 107 differ in their locations, sizes, and purposes for use. Hereinafter, their differences will be specifically explained.

Figure 12:
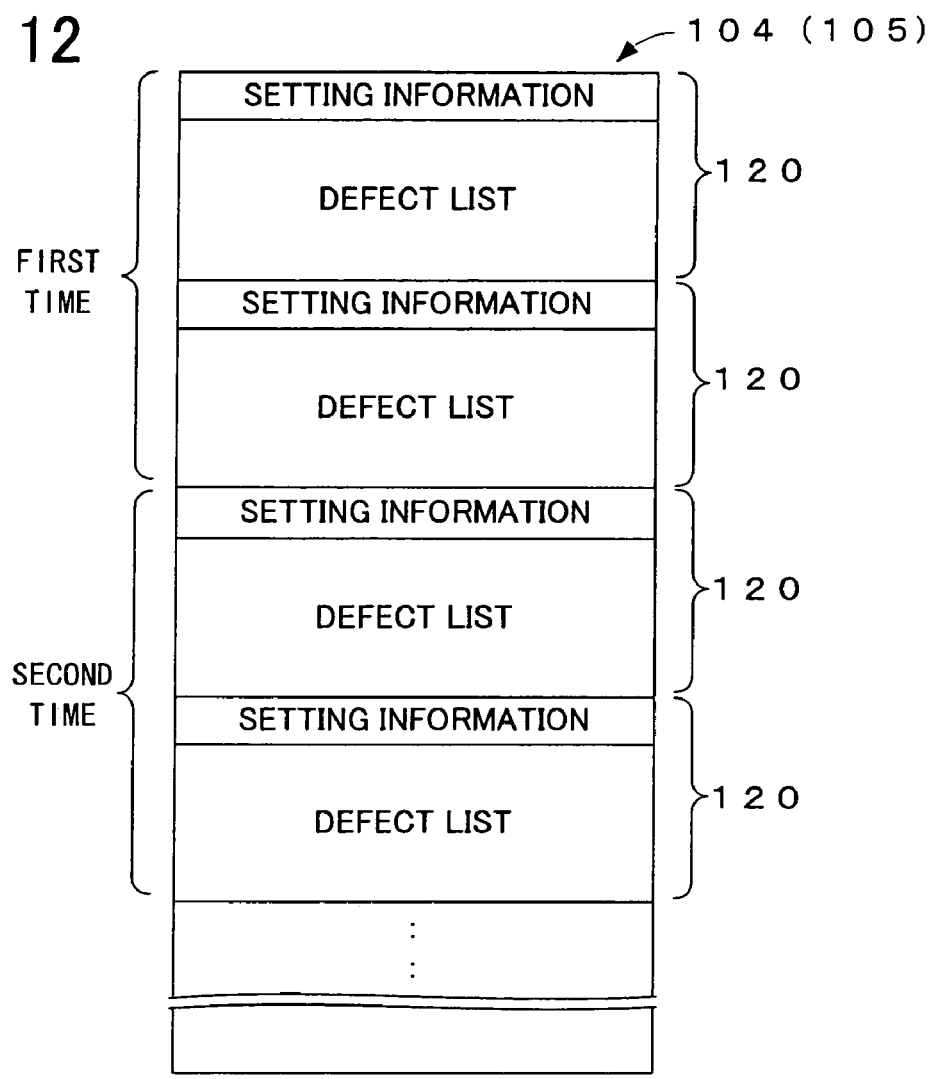
FIG. 12 is an explanatory diagram showing one example of the record content of a temporary defect management area in the example.

FIG. 12 shows one example of the situation that the defect management information 120 is recorded in the temporary defect management area 104 or 105. The temporary defect management areas 104 and 105 are intended to record the defect management information 120 temporarily until the optical disc 100 is finalized. The defect management information 120 is necessary for the defect management. The presence or absence and the position of a defect are different for each optical disc, so that it is necessary to record and maintain the defect management information 120 on each optical disc. In the example, at a stage before the finalizing, the defect management information 120 is recorded and maintained in the temporary defect management area 104 or 105 on the optical disc 100.

In the example, as shown in FIG. 12, the defect management information 120 is recorded twice repeatedly in an unrecorded area in the temporary defect management area 104 or 105. Incidentally, FIG. 12 shows the four defect management information 120 in total because such a process of repeatedly recording the defect management information 120 is performed twice in an unrecorded area. This makes it possible to surely record and reproduce the defect management information 120.

Until the optical disc 100 is finalized, the defect management information 120 may be updated several times in some cases. For example, if dusts are attached on the optical disc 100 between the first recording and the second recording (i.e., additional or postscript recording), the defect (or dusts) is detected upon the second recording. On the basis of this detection, the defect list 122 is updated. When the defect list 122 is updated, the defect management information 120 including the updated defect list 122 is recorded into the temporary defect management area 104 or 105. The optical disc 100 is a write-once-type recording medium but not a rewritable-type recording medium, so that it is impossible to overwrite the updated defect management information 120 on the existing defect management information 120. Thus, as shown in FIG. 12, the updated defect management information 120 is recorded in series after the existing defect management information 120.

In order to realize such repeated and serial recording of the defect management information 120, the temporary defect management areas 104 and 105 are larger than the definite defect management areas 106 and 107.

Figure 13:
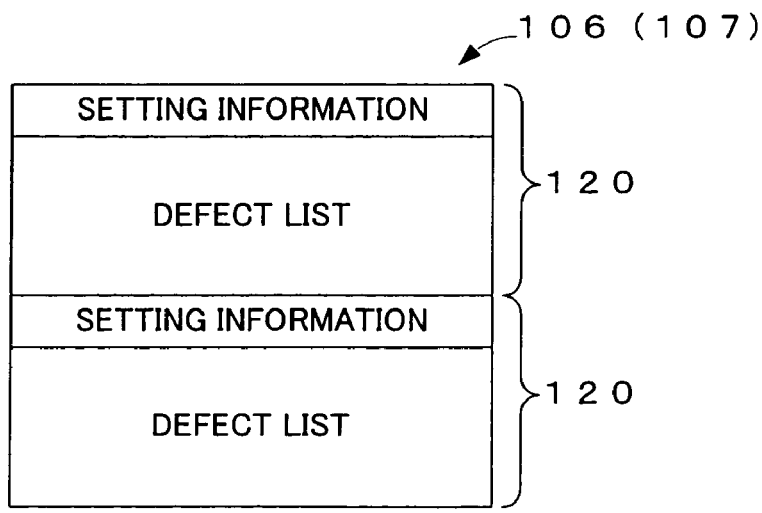
FIG. 13 is an explanatory diagram showing one example of the record content of a definite defect management area in the example.

FIG. 13 shows one example of the situation that the defect management information 120 is recorded in the definite defect management area 106 or 107. The definite defect management areas 106 and 107 are intended to record the defect management information 120 definitely when the optical disc 100 is finalized. Namely, at a stage before the finalizing, the definite defect management areas 106 and 107 are unrecorded (or blank). When the optical disc 100 is finalized, the defect management information 120 is recorded in the definite defect management areas 106 and 107, and the recording situation is continued subsequently.

In the example, as shown in FIG. 13, the defect management information 120 is recorded twice in a row in an unrecorded area in the definite defect management area 106 or 107. This makes it possible to surely record and reproduce the defect management information 120.

According to the optical disc 100 in the example, the temporary defect management area (104, 105) is placed between the control information recording area (the lead-in area 101 or the lead-out area 103), which allows the compatibility between the write-once-type optical disc 100 and a general rewritable optical disc. In order to realize the compatibility with a general rewritable-type optical disc, the write-once-type optical disc 100 needs to have the lead-in area, the data zone, and the lead-out area, and needs to maintain a basic recording structure, such as the order, position, and size (area) of the areas. The optical disc 100 maintains such a basic recording structure although it is provided with the temporary defect management areas 104 and 105, which allows the compatibility. Namely, if the temporary defect management area 104 is placed in the lead-in area 101, because the temporary defect management area 104 is relatively large as described above, there is no choice to extend the size of the lead-in area 101, which is unfavorable. In this example, however, such a disadvantage does not occur because the temporary defect management area 104 is placed out of the lead-in area 101. Moreover, if the temporary defect management area 104 is placed in the data zone 102, the defect management information 120 having properties of the control information is included in the data zone 102 which is an area in which the record data is supposed to be recorded, causing the disadvantage that the control information and the record data, which is information having properties different from those of the control information, are mixed in the data zone 102. In this example, however, such a disadvantage does not occur because the temporary defect management area 104 is placed out of the data zone 102. The same is true for the defect management area 105.

The start address and end address of the user area 108, and the size information of the spare areas 109 and 110 are included in the setting information 121 in the defect management information 120 (refer to FIG. 10). This setting information 121 can be set by the recording/reproducing apparatus 200. Namely, it is allowed to change the start address and end address of the user area 108, and the sizes of the spare areas 109 and 110 if they are clearly shown as the setting information 121. Even if they are changed, it is possible to maintain the compatibility with a general rewritable-type recording medium. Therefore, it is possible to ensure a space between the lead-in area 101 and the data zone 102 by shifting the start address of the user data area 108 backward (to the outer circumferential side), and it is possible to place the temporary defect management area 104 in the space. Depending on how to set the start address of the user data area 108, it is possible to reserve or ensure the relatively wider (large-sized) temporary defect management area 104. The same is true for the temporary defect management area 105.

According to the optical disc 100, the definite defect management areas 106 and 107 are placed in the lead-in area 101 and the lead-out area 103, respectively, which allows the compatibility between the write-once-type optical disc 100 and a general rewritable optical disc. Namely, a general rewritable optical disc has areas to record the defect management information, the areas being placed in both the lead-in area and the lead-out area. The optical disc 100 also has the definite defect management areas 106 and 107 placed in the lead-in area 101 and the lead-out area 103, respectively. At this point, their recording structures coincide. Therefore, it is possible to ensure the compatibility between the write-once-type optical disc 100 and a general rewritable-type optical disc.

Example of Recording/Reproducing Apparatus

Figure 14:
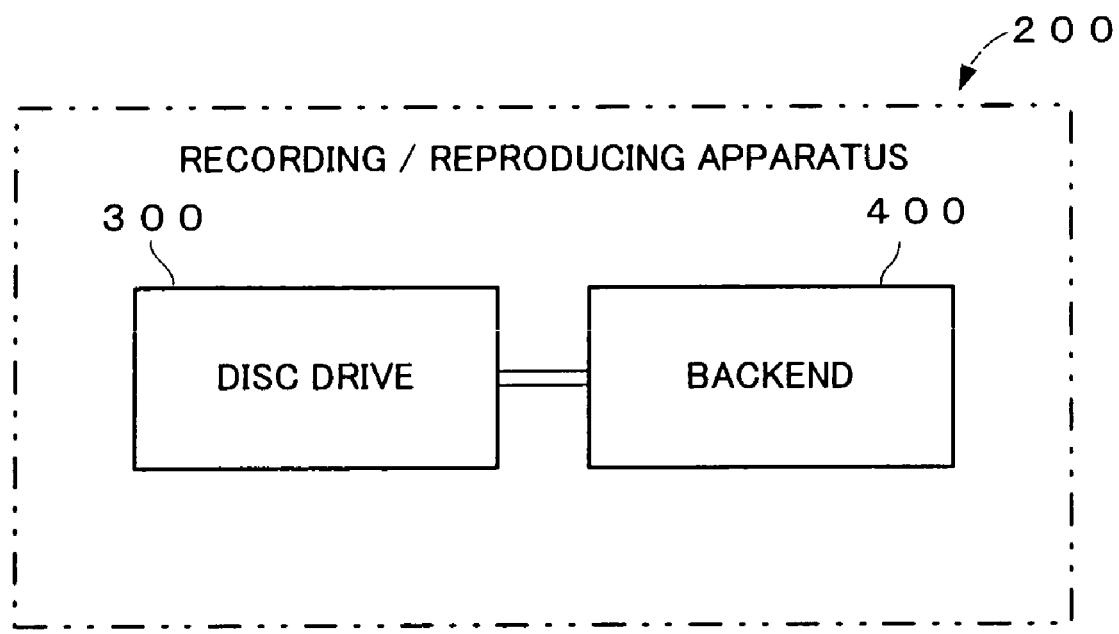
FIG. 14 is a block diagram showing a recording/reproducing apparatus, which is an example of the recording and reproducing apparatuses of the present invention.

The structure of a recording/reproducing apparatus in the example of the present invention will be explained. FIG. 14 shows the recording/reproducing apparatus 200, which is an example of the present invention. The recording/reproducing apparatus 200 is provided with: a function of recording the record data onto the optical disc 100; and a function of reproducing the record data recorded on the optical disc 100.

The recording/reproducing apparatus 200 is provided with: a disc drive 300; and a backend 400.

Figure 15:
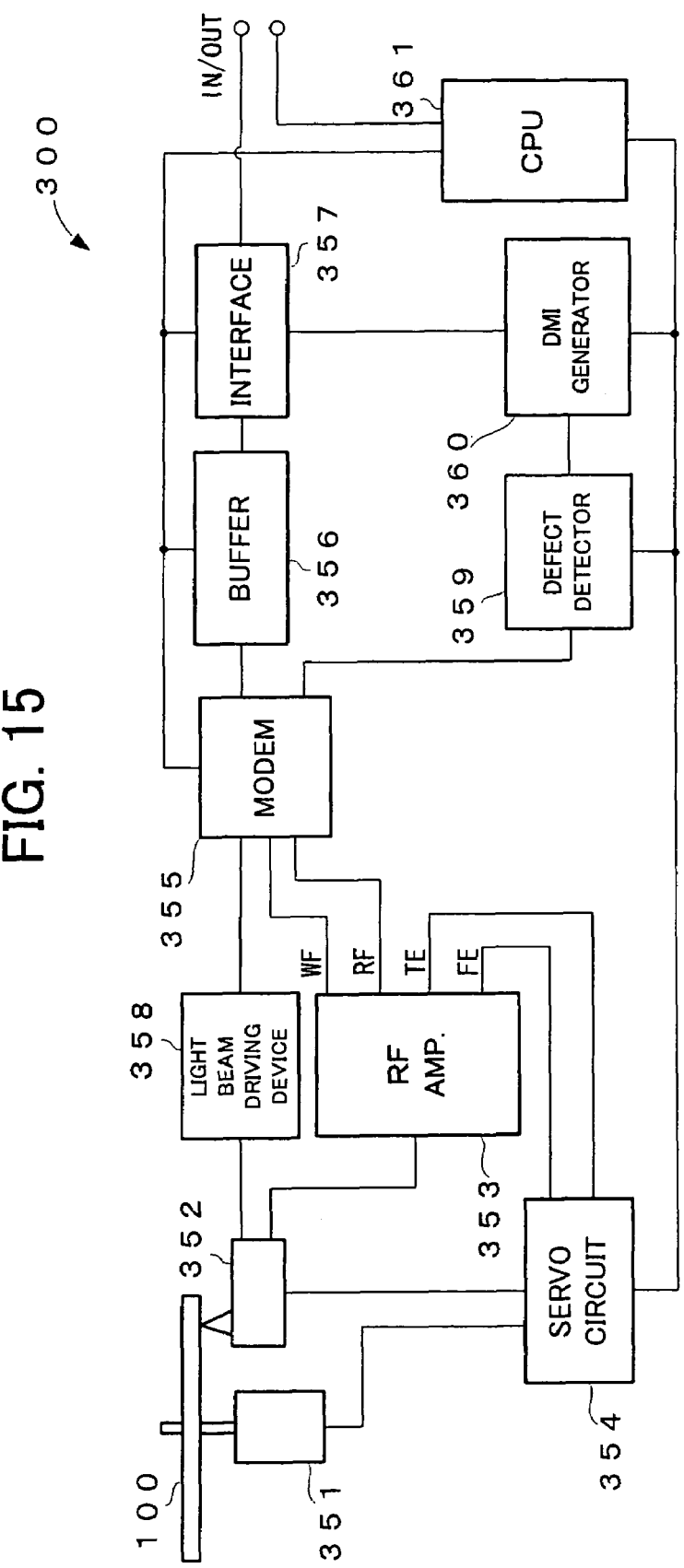
FIG. 15 is a block diagram showing a disc drive of the recording/reproducing apparatus in the example.

FIG. 15 shows the inner structure of the disc drive 300. The disc drive 300 records information onto the optical disc 100 and reads the information recorded on the optical disc 100.

As shown in FIG. 15, the disc drive 300 is provided with: a spindle motor 351; an optical pickup 352; a Radio Frequency (RF) amplifier 353; and a servo circuit 354.

The spindle motor 351 is a motor for rotating the optical disc 100.

The optical pickup 352 records the record data or the like onto the recording surface of the optical disc 100 by irradiating the recording surface with a light beam, and reads the record data or the like recorded on the recording surface by receiving reflected light of the light beam. The optical pickup 352 outputs a RF signal corresponding to the reflected light of the light beam.

The RF amplifier 353 amplifies the RF signal outputted from the optical pickup 352 and outputs it to a coder/decoder (CODEC) 355. Moreover, the RF amplifier 353 makes, from the RF signal, a wobble frequency signal WF, a track error signal TE, and a focus error signal FE, and outputs them.

The servo circuit 354 is a servo control circuit for controlling the driving of the optical pickup 352 and the spindle motor 351 on the basis of the track error signal TE, the focus error signal FE, and other servo control signals.

As shown in FIG. 15, the disc drive 300 is provided with: the CODEC 355; a buffer 356; an interface 357; and a light beam driving device 358.

The CODEC 355 is a circuit, provided with: a function of performing an error correction for the record data upon reading; and a function of appending an error correction code or mark to the record data upon recording so as to demodulate and decode the record data. Specifically, the CODEC 355 demodulates and decodes the RF signal outputted from the RF amplifier 353 upon reading, performs an error correction for the decoded RF signal, and then outputs this to the buffer 356. Moreover, if the error correction is impossible as a result of performing the error correction for the decoded RF signal, the CODEC 355 generates an error-correction-impossible signal for indicating that, and outputs this signal to a defect detector 359. Upon recording, the CODEC 355 appends the error correction code to the record data outputted from the buffer 356, demodulates and decodes this data to have a code suited to the optical characteristics or the like of the optical disc 100, and then outputs the decoded record data to the light beam driving device 358.

The buffer 356 is a memory circuit for storing the record data temporarily.

The interface 357 is a circuit for controlling the input/output or communication of the record data or the like between the disc drive 300 and the backend 400. Specifically, upon reproducing, the interface 357 responds a request command from the backend 400, and outputs the record data outputted from the buffer 356 (i.e. the record data read from the optical disc 100) to the backend 400. Upon recording, the interface 357 receives the record data which is inputted from the backend 400 to the disc drive 300, and outputs this data to the buffer 356. The interface 357 responds a request command from the backend 400 and outputs all or part of the defect lists maintained in a generator 360 for generating Defect Management Information (DMI generator 360) to the backend 400.

Upon recording, the light beam driving device 358 generates a light beam driving signal corresponding to the record data outputted from the CODEC 355, and outputs this signal to the optical pickup 352. The optical pickup 352 modulates a light beam on the basis of the light beam driving signal, and irradiates the recording surface of the optical disc 100 with it. This causes the recording of the record data or the like on the recording surface.

As shown in FIG. 15, the disc drive 300 is provided with: the defect detector 359; and the DMI generator 360.

The defect detector 359 is a circuit for detecting a defect on the optical disc 100. The defect detector 359 generates a defect detection signal for indicating the presence or absence of a defect, and outputs this signal. The defect detector 359 detects a defect on the basis of the result of the error correction of the record data upon reading information (upon verifying or reproducing). As described above, if the error correction is impossible as a result of performing the error correction for the decoded RF signal, the CODEC 355 generates the error correction impossible signal for indicating the fact, and outputs this signal to the defect detector 359. The defect detector 359 outputs the defect detection signal for indicating the presence of a defect when receiving this error correction impossible signal.

The DMI generator 360 is a circuit for generating or updating the defect management information 120 on the basis of the defect detection signal outputted from the defect detector 359. The defect management information 120 is rewritably stored into a memory circuit placed in the DMI generator 360. The DMI generator 360 responds to a request command from the backend 400 and outputs the defect management information 120 to the backend 400 through the interface 357.

As shown in FIG. 15, the disc drive 300 is equipped with a Central Processing Unit (CPU) 361. The CPU 361 controls the disc drive 300 as a whole, and controls the exchange of information among the elements in the disc drive 300 described above. The CPU 361 also controls the recording operation and reading operation of the record data and the defect management information 120. The CPU 361 responds to a control command or a request commend transmitted from the backend 400 and controls the exchange of data between the disc drive 300 and the backend 400.

Figure 16:
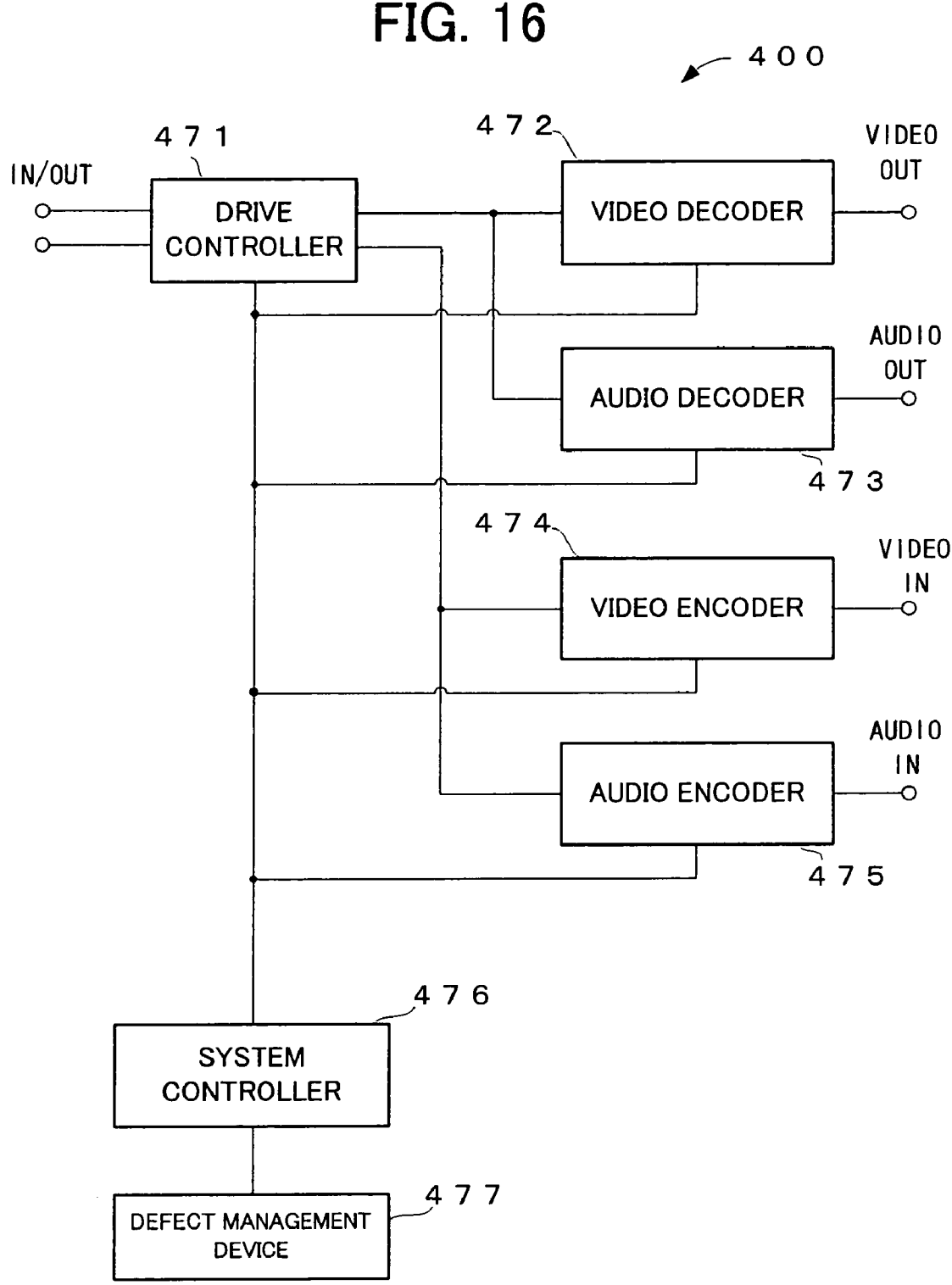
FIG. 16 is a block diagram showing a backend of the record/reproducing apparatus in the example.

FIG. 16 shows the inner structure of the backend 400. The backend 400 is an apparatus for reproducing the record data read from the optical disc 100 with the disc drive 300, receiving the record data supplied from the outside in order to record it onto the optical disc 100, compressing and encoding this record data, and transmitting it to the disc drive 300.

The backend 400 is provided with: a drive controller 471; a video decoder 472; an audio decoder 473; a video encoder 474; an audio encoder 475; a system controller 476; and a defect management device 477.

The drive controller 471 is a circuit for controlling the reading processing and recording processing of the disc drive 300. The backend 400 and the disc drive 300 cooperate and perform an operation of reading the record data from the optical disc 100 and reproducing it and an operation of receiving the record data from the outside and recording it onto the optical disc 100. The drive controller 471 realizes the cooperation of the backend 400 and the disc drive 300 by controlling the reading processing and recording processing of the disc drive 300. Specifically, the drive controller 471 outputs to the disc drive 300 request commands about reading, recording, outputting the record data from the buffer 356, outputting the defect management information 120 from the DMI generator 360, and so on. The drive controller 471 also controls the input and output of the record data, the defect management information 120, and other various information.

The video decoder 472 and the audio decoder 473 are circuits for decoding the record data which is read from the optical disc 100 by the disc drive 300 and which is supplied through the drive controller 471 and converting the record data to be reproducible with a display, a speaker, or the like.

The video encoder 474 and the audio encoder 475 are circuit for receiving a video signal, an audio signal, or the like inputted from the outside for the purpose of recording them on the optical disc 100, compressing and encoding them by Moving Picture Experts Group (MPEG) compressing and encoding method or the like, and supplying them to the disc drive 300 through the drive controller 471.

The system controller 476 is a circuit for controlling: the drive controller 471; the video decoder 472; the audio decoder 473; and the defect management device 477, and reproducing the record data in cooperation with the devices. Upon recording, the system controller 476 controls: the drive controller 471; the video encoder 474; the audio encoder 475; and the defect management device 477, to thereby record the record data in cooperation with the devices. Upon reproducing and recording, the system controller 476 controls the disc drive 300 (e.g. controls the generation and transmission of various request commands, the reception of a response signal, or the like) with the drive controller 471 in order to realize the cooperation of the disc drive 300 and the backend 400.

The defect management device 477 has therein a memory circuit and has a function of receiving and maintaining all or part of the defect management information 120 made or updated by the DMI generator 360 in the disc drive 300. The defect management device 477 performs the defect management with the system controller 476.

Figure 17:
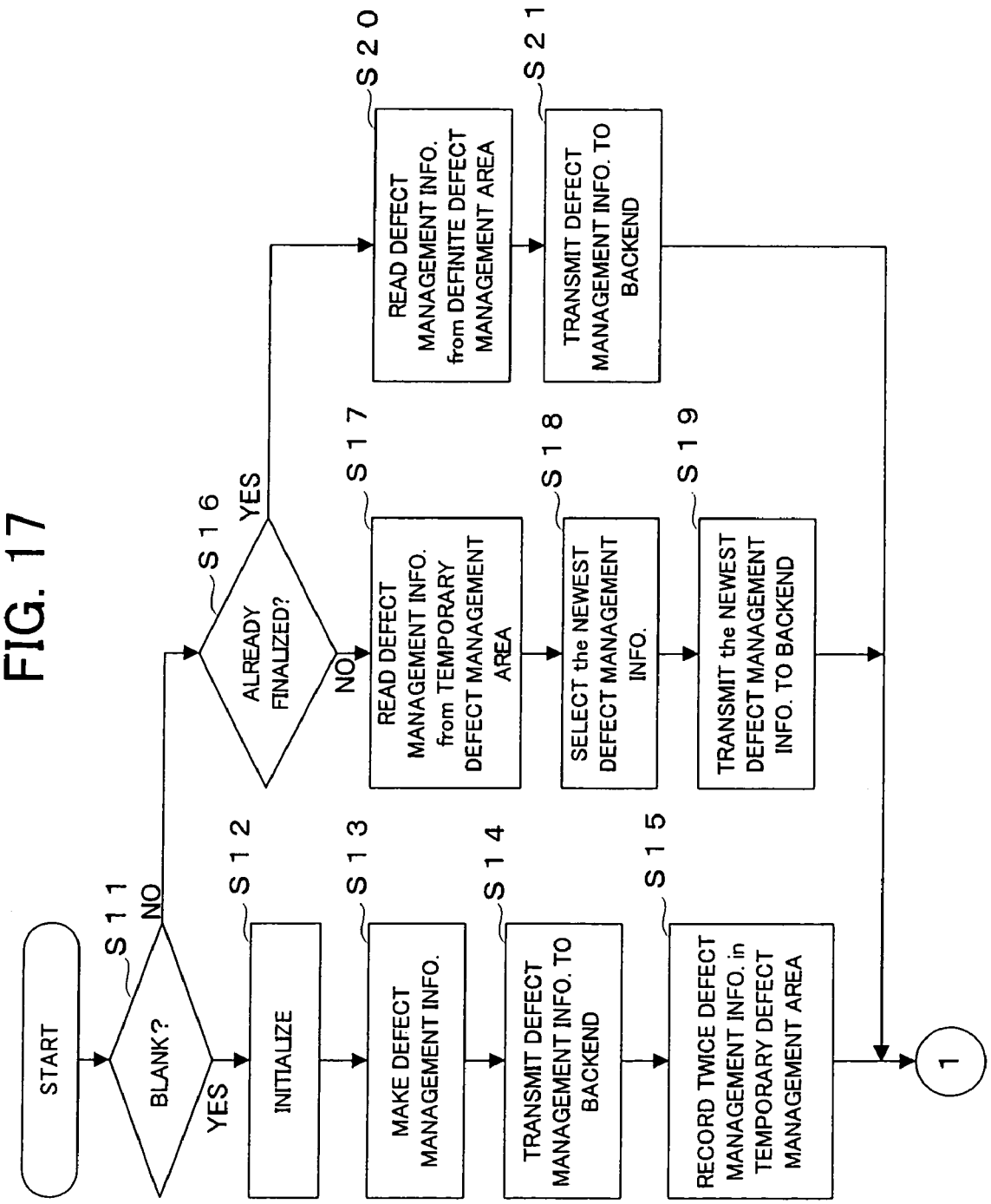
FIG. 17 is a flowchart showing an initial setting operation of the recording/reproducing apparatus in the example.

Next, an initial setting operation of the recording/reproducing apparatus 200 will be explained. FIG. 17 shows an initial setting operation of the recording/reproducing apparatus 200. The recording/reproducing apparatus 200 performs the initial setting between (i) when the optical disc 100 is inserted or loaded in the drive unit 300 and (ii) when the record data is recorded or reproduced. The initial setting is processing for preparing for the recording or reproducing of the record data, and includes various processing. Out of the processing, the initialization of the optical disc 100, the generation of the defect management information 120, the transmission of the defect management information 120 to the backend 400, or the like will be explained below. The processing is performed mainly under the control of the CPU 361 of the drive unit 300.

As shown in FIG. 17, when the optical disc 100 is inserted or loaded into the drive unit 300, the CPU 361 of the drive unit 300 judges whether or not the optical disc 100 is an unrecorded disc i.e., a blank disc (step S11).

When the optical disc 100 is a blank disc (the step S11: YES), the CPU 361 initializes the optical disc 100 (step S12). In this initializing, the DMI generator 360 generates the defect management information 120 (step S13). Specifically, it obtains the start address and end address of the user data area 108 and the sizes of the spare areas 109 and 110, which are set in the initializing, and generates the setting information 121. Moreover, it generates the defect list 122. The defect list 122 generated at this time has only an outline, not having any content. Namely, the defect address is not recorded in it, nor is the specific spare address. A header, identification information, or the like are only recorded. The generated defect management information 120 is stored and maintained in the DMI generator 360.

Then, the CPU 361 transmits the defect management information 120 stored in the DMI generator 360 to the backend 400 (step S14). The defect management information 120 is stored into the defect management device 477 of the backend 400.

Then, the CPU 361 records the defect management information 120 stored in the DMI generator 360 twice repeatedly in an unrecorded area in the temporary defect management area 104 or 105 of the optical disc 100 (step S15).

On the other hand, when the optical disc 100 is not a blank disc (the step S11: NO), the CPU 361 judges whether or not the optical disc 100 is already finalized (step S16). The finalizing is processing for arranging a recording format so that the optical disc 100 can be reproduced by a reproducing apparatus for a general rewritable-type optical disc and a reproducing apparatus for a general optical disc of a reproduce only type. It is possible to recognize whether or not the optical disc 100 is already finalized by referring to the control information recorded in the lead-in area or the like.

When the optical disc 100 is not finalized yet (the step S16: NO), the CPU 361 reads the defect management information 120 from the temporary defect management area 104 or 105 of the optical disc 100 (step S17). Namely, when the optical disc 100 is not a blank disc, because the defect management information 120 already generated in the past is recorded in the temporary defect management area 104 or 105, this information is read in the step.

Moreover, if a plurality of defect management information 120 is recorded in the temporary defect management area 104 or 105, the CPU 361 selects and reads the newest defect management information 120 among them (step S18). Namely, at a stage before the finalizing, the defect management information 120 is recorded in the temporary defect management area 104 or 105 every time it is updated. The plurality of defect management information 120 is arranged in series in the updated order. Therefore, the defect management information placed at the end is the newest defect management information in the temporary defect management area 104 or 105. The CPU 361 selects and reads the defect management information placed at the end.

In order to specify the defect management information 120 placed at the end (or the last defect management information 120), the example adopts the following method. Namely, in the case where a plurality of defect management information 120 are already recorded sequentially in a row in the temporary defect management area 104 or 105, information is recorded from the start address of the temporary defect management area 104 or 105 to the end address of the area in which the last defect management information 120 is recorded, and the subsequent area is unrecorded or blank. The CPU 361 controls the optical pickup 352 and scans the temporary defect management area 104 or 105, starting from the start address. Then, it detects a position from which a blank condition starts and scans backward the temporary defect management area 104 or 105 from the position. This is how to specify the last defect management information 120. By this type of method, it is possible to easily specify the last or latest defect management information 120 without using a pointer or the like.

The CPU 361 stores the read last defect management information 120 into the DMI generator 360 and transmits this information to the backend 400 (step S19). The last defect management information 120 is stored into the defect management device 477 of the backend 400.

On the other hand, when the optical disc 100 is not a blank disc but is already finalized (the step S16: YES), the CPU 361 reads the defect management information 120 from the definite defect management area 106 or 107 (step S20), and transmits this information to the backend 400 (step S21). The defect management information 120 is stored into the defect management device 477 of the backend 400.

As described above, the defect management information 120 is generated, or is selectively read from the temporary defect management area 104 or 105, or is read from the definite defect management area 106 or 107. Then, it is recorded into the DMI generator 360 and is recorded into the defect management device 477 of the backend 400. This completes the preparation for the defect management and ends the initial setting.

Figure 18:
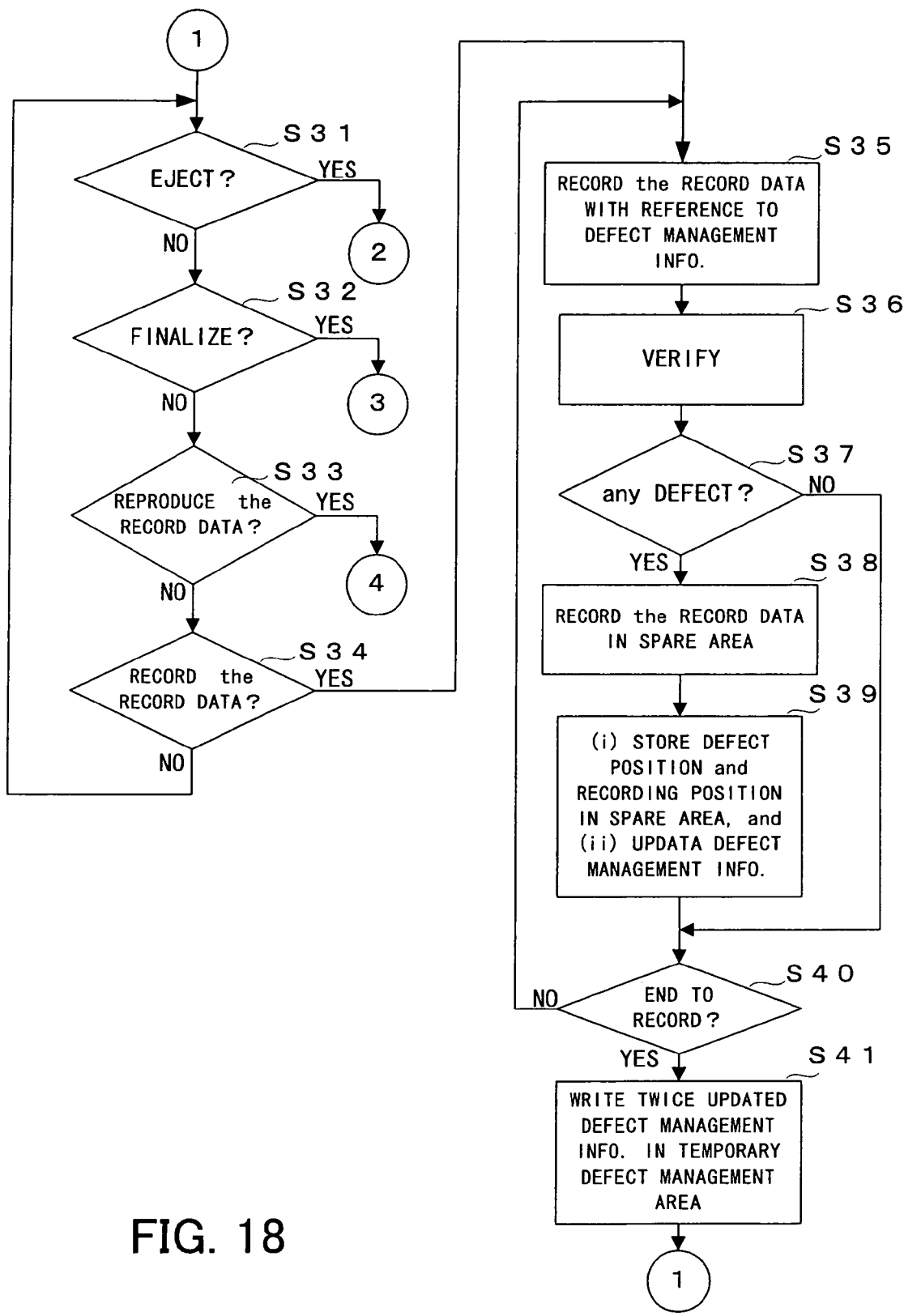
FIG. 18 is a flowchart showing operations including a recording operation of the recording/reproducing apparatus in the example.

Next, a recording operation of the recording/reproducing apparatus 200 will be explained. FIG. 18 mainly shows a recording operation of the recording/reproducing apparatus 200. The recording/reproducing apparatus 200 performs a recording operation of recording the record data into the user data area 108 on the optical disc 100. The recording/reproducing apparatus 200 performs the recording operation while performing the defect management. The recording/reproducing apparatus 200 performs verifying during the recording operation and updates the defect list 122 on the basis of the verifying. The recording operation is realized by the cooperation of the CPU 361 of the disc drive 300 and the system controller 376 of the backend 400.

As shown in FIG. 18, after judging whether or not an instruction of ejecting, finalizing or reproducing the record data from the optical disc 100 is given (steps S31, S32 and S33), when a user inputs an instruction of starting to record (step S34: YES), the recording/reproducing apparatus 200 responds to this and records the record data (step S35). The record data is recorded into each predetermined block. The recording/reproducing apparatus 200 refers to the defect management information stored in the defect management device 477 of the backend 400 and records the record data while performing the defect management on the basis of the information.

The recording/reproducing apparatus 200 performs verifying at each time of the one block recording (step S36), and updates the defect management information 120 on the basis of the result of the verifying. Incidentally, the defect management information 120 which is updated is the defect management information stored in the DMI generator 360 of the drive unit 300. Specifically, when it is recognized, as a result of the verifying, that the record data fails to be record (step S37: YES), the CPU 361 of the disc drive 300 records the record data that fails to be recorded into the spare area 109 or 110 (step S38). Then, the CPU 361 estimates that there is a defect in a place in which the record data is supposed to be recorded, and records the defect address for indicating the place and the corresponding spare address onto the defect list 122 (step S39).

When the above-described steps S35 to S39 ends with respect to a series of blocks of the record data to be recorded this time, the CPU 361 records the updated defect management information 120 twice repeatedly in the unrecorded area in the temporary defect management area 104 or 105 of the optical disc 100 (step S41). Incidentally, the defect management information 120 recorded in the temporary defect management area 104 or 105 is the defect management information stored in the DMI generator 360. Then, the recording operation is completed.

Figure 19:
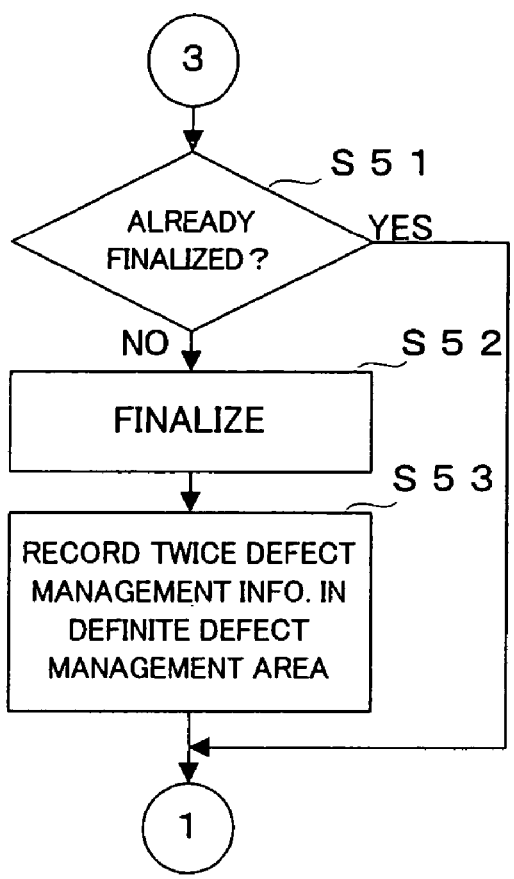
FIG. 19 is a flowchart showing a finalize operation of the recording/reproducing apparatus in the example.

Next, a finalize operation of the recording/reproducing apparatus 200 will be explained. FIG. 19 shows a finalize operation of the recording/reproducing apparatus 200. For example, when the user inputs an instruction for indicating to finalize (the step S32 in FIG. 18: YES), as shown in FIG. 19, the recording/reproducing apparatus 200 confirms that the optical disc 100 is not finalized yet (step S51: NO) and finalizes the optical disc 100 (step S52). Upon finalizing, the recording/reproducing apparatus 200 records the defect management information 120 twice repeatedly in the unrecorded area in the definite defect management area 106 or 107 on the optical disc 100 (step S53). Incidentally, the defect management information 120 recorded in the definite defect management area 106 or 107 is the defect management information stored in the DMI generator 360. Then, the finalizing is completed.

Figure 20:
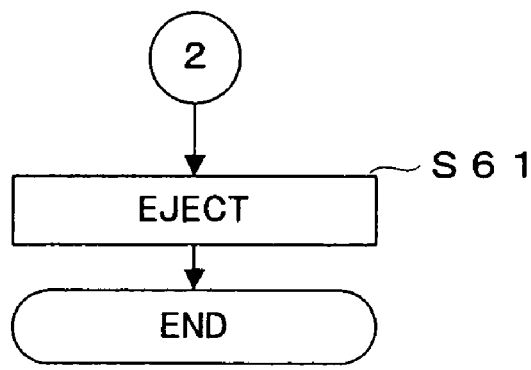
FIG. 20 is a flowchart showing an operation on ejecting of the recording/reproducing apparatus in the example.

Next, when the user inputs an instruction to eject the optical disc 100 from the recording/reproducing apparatus 200 (the step S31 in FIG. 18: YES), as shown in FIG. 20, the recording/reproducing apparatus 200 ejects the optical disc 100 immediately (step S61).

Figure 21:
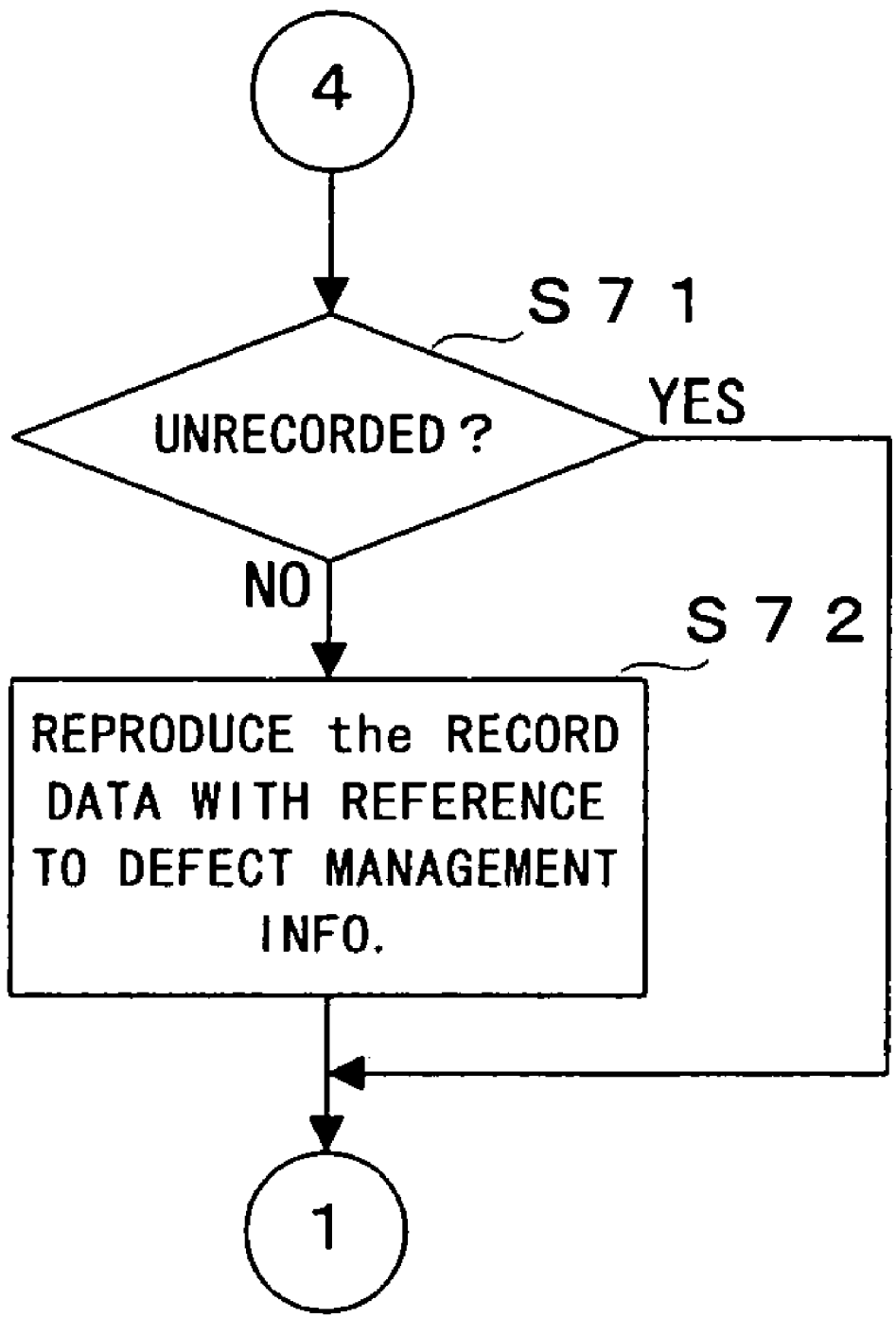
FIG. 21 is a flowchart showing a reproduction operation of the recording/reproducing apparatus in the example.

Next, a reproduction operation of the recording/reproducing apparatus 200 will be explained. FIG. 21 shows a reproduction operation of the recording/reproducing apparatus 200.

When the user inputs an instruction of starting to reproduce (the step S33 in FIG. 18: YES), as shown in FIG. 21, the recording/reproducing apparatus 200 confirms that the optical disc 100 is not a blank disc (the step S71: NO), and reproduces the record data recorded in the user data area 108 on the optical disc 100 (step S72). The recording/reproducing apparatus 200 reproduces the record data while performing the defect management on the basis of the defect management information 120 stored in the defect management device 477 of the backend 400.

As described above, according to the recording/reproducing apparatus 200, it records the defect management information 120 into the temporary defect management area 104 or 105 on the optical disc 100 before finalizing the optical disc 100, and it records the defect management information 120 into the definite defect management area 106 or 107 on the optical disc 100 when finalizing the optical disc 100.

With respect to the optical disc 100 which is not finalized yet, the recording/reproducing apparatus 200 reads the defect management information 120 from the temporary defect management area 104 or 105 on the optical disc 100. With respect to the optical disc 100 which is already finalized, the recording/reproducing apparatus 200 reads the defect management information 120 from the definite defect management area 106 or 107 on the optical disc 100. This makes it possible to realize the recording or reproducing of the record data while performing the appropriate defect management with respect to both the optical disc 100 which is not finalized yet and the optical disc 100 which is already finalized.

According to the recording/reproducing apparatus 200 in the example, it is constructed to record the defect management information 120 into the definite defect management area 106 or 107 on the optical disc 100 upon finalizing. Thus, it is possible to establish the compatibility between the write-once-type optical disc 100 and a general rewritable optical disc.

Figure 22:
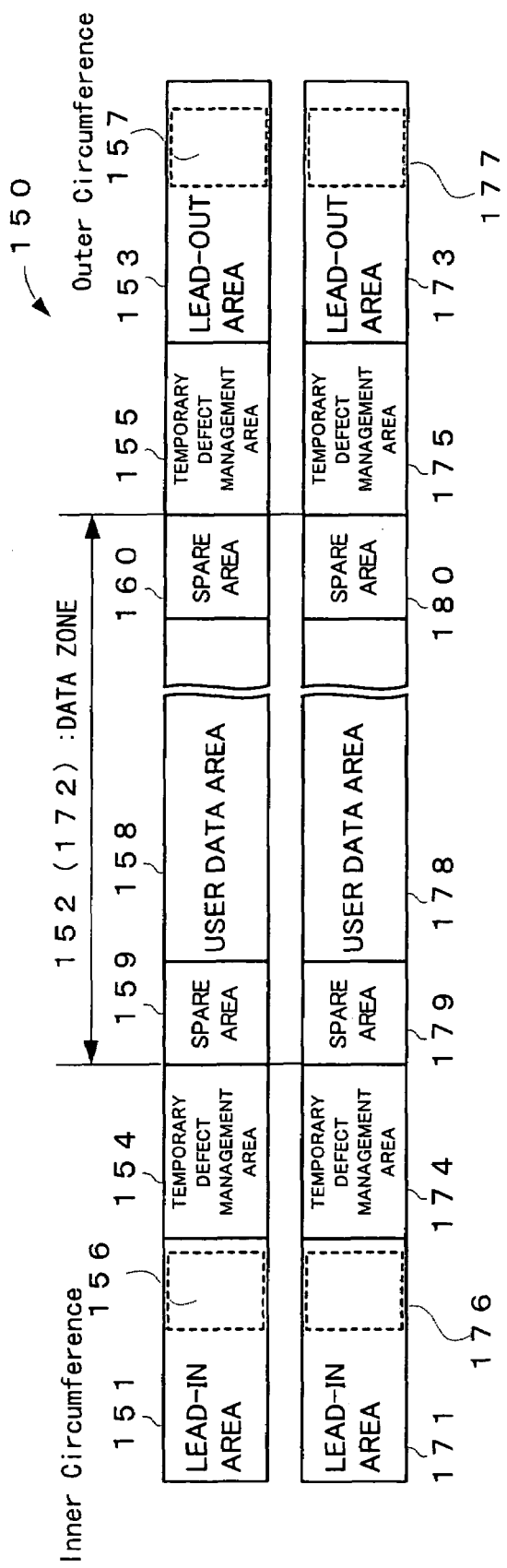
FIG. 22 is an explanatory diagram showing another example of the write-once-type recording medium of the present invention.

In the above-described example, the case where the write-once-type recording medium of the present invention is applied to a one-layer optical disc is taken as the example. The present invention, however, is not limited to this example and can be applied to a two or more layer optical disc. FIG. 22 shows another example in which the write-once-type recording medium of the present invention is applied to a two-layer optical disc 150. A first layer of the two-layer optical disc 150 in FIG. 22 (the upper part of FIG. 22) is provided with: a lead-in area 151; a data zone 152; and a lead-out area 153, as with the optical disc 100, with a temporary defect management area 154 placed between the lead-in area 151 and the data zone 152, and with a temporary defect management area 155 placed between the data zone 152 and the lead-out area 153. The lead-in area 151 and the lead-out area 153 are provided with definite defect management areas 156 and 157, respectively. The data zone 152 is provided with: a user data area 158; a spare area 159; and a spare area 160. A second layer is provided with: a lead-in area 171; a data zone 172; and a lead-out area 173, as with the optical disc 100, with a temporary defect management area 174 placed between the lead-in area 171 and the data zone 172, and with a temporary defect management area 175 placed between the data zone 172 and the lead-out area 173. The lead-in area 171 and the lead-out area 173 are provided with definite defect management areas 176 and 177, respectively. The data zone 172 is provided with: a user data area 178; a spare area 179; and a spare area 180.

The present invention can be changed if desired without departing from the scope or spirit of the invention which can be read from the claims and the entire specification. A write-once-type recording medium, a recording apparatus, a reproducing apparatus, a recording method, a reproducing method, and a computer program that realizes these functions, which accompany such changes, are also intended to be within the technical scope of the present invention.

INDUSTRIAL APPLICABILITY

A write-once-type recording medium, a recording apparatus and a recording method for the write-once-type recording medium, a reproducing apparatus and a reproducing method for the write-once-type recording medium, and a computer program that realizes these functions associated with the present invention can be applied to a high-density recording medium, such as an optical disc, a magnetic disc, and a magneto-optical disc, for example. Moreover, they can be applied to a recording medium, a recording/reproducing apparatus, or the like, which are mounted on or can be connected to various computer equipment, for example.

The invention claimed is:

1. A write-once-type recording medium comprising:
   a data area to record therein record data;
   a control information recording area to record therein information for controlling an operation of recording and/or reading in said data area, said control information recording area including a definite defect management area to record therein defect management information of said data area; and
   a temporary defect management area to temporarily record therein the defect management information of said data area, said temporary defect management area being located between said control information recording area and said data area.

2. The write-once-type recording medium according to claim 1, wherein said temporary defect management area is a first temporary defect management area located between (i) said control information recording area located on an inner circumferential side of said data area and (ii) said data area.

3. The write-once-type recording medium according to claim 1, wherein said temporary defect management area is a first temporary defect management area located between (i) said control information recording area located on an outer circumferential side of said data area and (ii) said data area.

4. The write-once-type recording medium according to claim 1, wherein said temporary defect management area is large enough to record therein the defect management information of said data area a plurality of times repeatedly.

5. The write-once-type recording medium according to claim 1, wherein said data area includes a spare area for recording the record data which is evacuated from a defect.

6. A recording apparatus for recording record data onto a write-once-type recording medium comprising: (i) a data area to record therein the record data; (ii) a control information recording area to record therein information for controlling an operation of recording and/or reading in said data area, said control information recording area including a definite defect management area to record therein defect management information of said data area; and (iii) a temporary defect management area to temporarily record therein the defect management information of said data area, said temporary defect management area being located between said control information recording area and said data area, said recording apparatus comprising:
   a first recording device for recording the record data into said data area;
   a memory device for storing therein the defect management information;
   a second recording device for recording the defect management information stored in said memory device, into said temporary defect management area; and
   a third recording device for recording the defect management information stored in said memory device, into said definite defect management area.

7. The recording apparatus according to claim 6, wherein the defect management information includes:
   definition information for indicating a position of said data area; and
   a defect list including (i) defect position information for indicating a position of a defect in the said data area and (ii) spare area position information for indicating a position of a spare area at which the record data to be recorded at the position of the defect is alternatively recorded.

8. The recording apparatus according to claim 6, further comprising:
a first defect-management-information generating device for generating the defect management information with respect to said write-once-type recording medium, on which the record data is unrecorded, and storing the generated defect management information into said memory device; and
a first recording control device for controlling said second recording device to record the defect management information into said temporary defect management area in case that the defect management information is generated by said first defect-management-information generating device.

9. The recording apparatus according to claim 8, wherein said first or second defect-management-information generating device comprises:
a defect detecting device for detecting a defect in the said data area; and
a spare area reserving device for reserving a spare area corresponding to the defect in said data area.

10. The recording apparatus according to claim 6, further comprising:
a second defect-management-information generating device for generating or updating the defect management information and storing the generated or updated defect management information into said memory device, in case that the record data is recorded by said first recording device into said data area; and
a second recording control device for controlling said second recording device to record the defect management information into said temporary defect management area in case that the defect management information is generated or updated by said second defect-management-information generating device.

11. The recording apparatus according to claim 10, further comprising:
a defect-management-information obtaining device for reading the defect management information from said temporary defect management area on said write-once-type recording medium, on which the defect management information is recorded in said temporary defect management area, and storing the read defect management information into said memory device,
wherein
said second defect-management-information generating device updates the defect management information, which is stored by said defect-management-information obtaining device in said memory device, in case that the record data is recorded by said first recording device into said data area, and
said second recording control device records the defect management information into said temporary defect management area in case that the defect management information is updated.

12. The recording apparatus according to claim 6, further comprising:
a finalize-command device for giving a command for indicating to finalize said write-once-type recording medium; and
a third recording control device for controlling said third recording device to record the defect management information stored in said memory device, into said definite defect management area in case that the command for indicating to finalize is given by said finalize-command device.

13. The recording apparatus according to claim 12, wherein said finalize-command device gives the command for indicating to finalize in response to an eject command.

14. The recording apparatus according to claim 6, wherein said second recording device records the defect management information a plurality of times repeatedly in said temporary defect management area.

15. The recording apparatus according to claim 6, wherein said second recording device redundantly records the defect management information in a plurality of temporary defect management areas present at a plurality of points respectively on said write-once-type recording medium.

16. The recording apparatus according to claim 6, further comprising an area setting device for setting an areal size of said temporary defect management area and setting the position of said data area depending on the set areal size of said temporary defect management area.

17. A reproducing apparatus for reproducing record data recorded on a write-once-type recording medium comprising: (i) a data area to record therein the record data; (ii) a control information recording area to record therein information for controlling an operation of recording and/or reading in said data area, said control information recording area including a definite defect management area to record therein defect management information of said data area; and (iii) a temporary defect management area to temporarily record therein the defect management information of said data area, said temporary defect management area being located between said control information recording area and said data area,
said reproducing apparatus comprising:
a memory device;
a first reading device for reading the defect management information recorded in said temporary defect management area and storing the read defect management information into said memory device; and
a reproducing device for reproducing the record data recorded in said data area on the basis of the defect management information stored in said memory device.

18. The reproducing apparatus according to claim 17, wherein the defect management information includes:
definition information for indicating a position of said data area; and
a defect list including (i) defect position information for indicating a position of a defect in the said data area and (ii) spare area position information for indicating a position of a spare area at which the record data to be recorded at the position of the defect is alternatively recorded.

19. The reproducing apparatus according to claim 17, comprising:
a finalize-detecting device for detecting whether or not said write-once-type recording medium is already finalized;
a second reading device for reading the defect management information recorded in said definite defect management area and storing the read defect management information into said memory device; and
a reading control device for (i) controlling said second reading device to read the defect management information recorded in said definite defect management area and storing the read defect management information into said memory device in case that it is detected that said write-once-type recording medium is already finalized and (ii) controlling said first reading device to read the defect management information recorded in said temporary defect management area and storing the read defect management information into said memory device in case that it is detected that said write-once-type recording medium is not finalized yet, on the basis of a detection result by said finalize-detecting device.

20. A recording method of recording record data onto a write-once-type recording medium comprising: (i) a data area to record therein the record data; (ii) a control information recording area to record therein information for controlling an operation of recording and/or reading in said data area, said control information recording area including a definite defect management area to record therein defect management information of said data area; and (iii) a temporary defect management area to temporarily record therein the defect management information of said data area, said temporary defect management area being located between said control information recording area and said data area, said recording method comprising:
- a first recording process of recording the record data into said data area;
- a defect-management-information generating process of generating or updating the defect management information;
- a second recording process of recording the defect management information generated or updated in said defect-management information generating process, into said temporary defect management area;
- a finalize-command process of giving a command for indicating to finalize said recording medium; and
- a third recording process of recording the defect management information generated or updated in said defect-management-information generating process, into said definite defect management area in case that the command for indicating to finalize is given in said finalize-command process.

21. A reproducing method of reproducing record data recorded on a write-once-type recording medium comprising: (i) a data area to record therein the record data; (ii) a control information recording area to record therein information for controlling an operation of recording and/or reading in said data area, said control information recording area including a definite defect management area to record therein defect management information of said data area; and (iii) a temporary defect management area to temporarily record therein the defect management information of said data area, said temporary defect management area being located between said control information recording area and said data area, said reproducing method comprising:
- a detecting process of detecting whether or not said recording medium is already finalized;
- a first reading process of reading the defect management information recorded in said temporary defect management area and storing the read defect management information into said memory device in case that it is detected that said write-once-type recording medium is not finalized;
- a second reading process of reading the defect management information recorded in said definite defect management area and storing the read defect management information into said memory device in case that it is detected that said write-once-type recording medium is already finalized; and
- a reproducing process of reproducing the record data recorded in said data area on the basis of the defect management information stored in said memory device.

\* \* \* \* \*